(12) United States Patent
Itoh

(10) Patent No.: US 6,208,451 B1
(45) Date of Patent: Mar. 27, 2001

(54) POLARIZATION CONVERSION SYSTEM, ILLUMINATION SYSTEM, AND PROJECTOR

(75) Inventor: Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/511,925

(22) Filed: Feb. 23, 2000

(30) Foreign Application Priority Data

Feb. 23, 1999 (JP) .................................................. 11-044669

(51) Int. Cl.⁷ ...................................................... G02F 1/03
(52) U.S. Cl. ............................................ 359/247; 359/246
(58) Field of Search ...................................... 359/618, 495, 359/497, 250, 251, 253, 256, 246, 237, 247

(56) References Cited

U.S. PATENT DOCUMENTS 5,986,809 * 11/1999 Itoh et al. .............................. 359/618
6,108,131 8/2000 Hansen et al. ........................ 359/486

FOREIGN PATENT DOCUMENTS 8-304739  11/1996  (JP) .

* cited by examiner

Primary Examiner—Hung Xuan Dang
(74) Attorney, Agent, or Firm—Oblon, Spivak, McClelland, Maier & Neustadt, P.C.

(57) ABSTRACT

A polarization conversion system comprises a polarized light selective reflector that divides incident unpolarized light into first and second types of polarized light, transmits the first type of polarized light and reflects the second type of polarized light, a relay optical system that relays an incident light beam onto the polarized light selective reflector, a polarized light reflector, disposed on an optical path of a reflected light beam reflected by the polarized light selective reflector, that reflect the reflected light beam back to the polarized light selective reflector while converting the second type of polarized light to polarized light of the first type.

22 Claims, 15 Drawing Sheets

4000

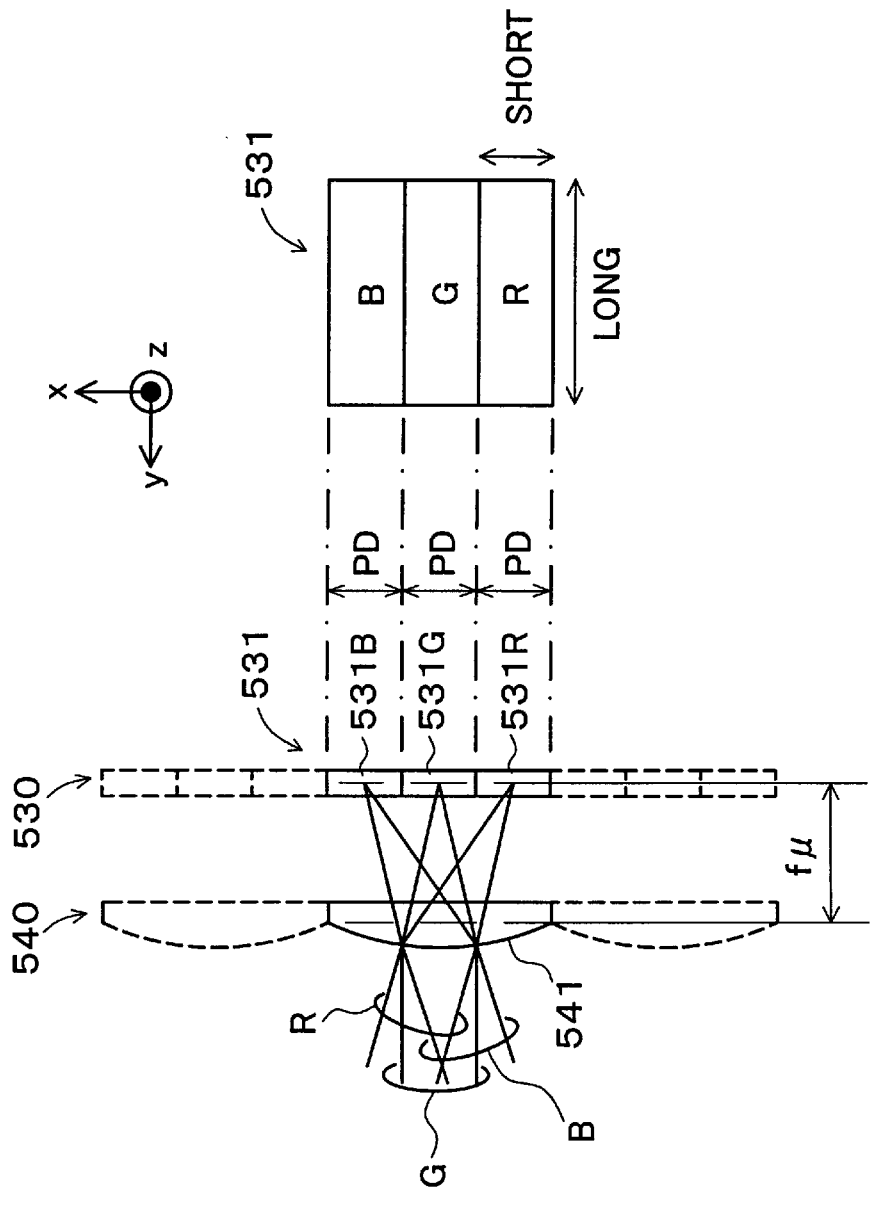

POLARIZATION CONVERSION SYSTEM, ILLUMINATION SYSTEM, AND PROJECTOR

BACKGROUND OF THE INVENTION

1. Field of the Invention

This invention relates to a polarization conversion system that converts unpolarized light to a specifically polarized light, and to an optical system using the polarization conversion system.

2. Description of the Related Art

Liquid crystal panels are extensively utilized in direct-view display apparatuses and projectors. In a projector, for example, liquid crystal panels (liquid crystal light valves) are used to modulate illumination light in accordance with image information, and the modulated light is projected onto a screen to thereby display images. Generally, since the images are displayed by modulating specific linearly polarized light, it is necessary to provide a polarization plate at the light entry side of the liquid crystal panel in order to convert the unpolarized light emitted by a light source to the requisite linearly polarized light. However, this results in the loss of half or more of the light due to absorption by the polarization plate. To increase the light utilization efficiency of the illumination system with respect to the liquid crystal panel, an optical polarization conversion system is typically employed to convert the light from the light source to one type of linearly polarized light.

Japanese Patent Laid-open Gazette No. 8-304739 discloses an illumination system using a polarization conversion system. This polarization conversion system comprises a polarization splitting prism array consisting of a plurality of polarization beam splitters and a plurality of reflecting mirrors, and a $\lambda/2$ retardation film provided on the exit side of the polarization beam splitting prism array. In this polarization conversion system, the polarization splitting prism array is used to split the unpolarized light into two types of linearly polarized light in which the plane of polarization of one is perpendicular to that of the other, and a $\lambda/2$ retardation film is then used to align the polarization direction of one of these beams of linearly polarized light with the polarization direction of the other beam of linearly polarized light, whereby the light is converted into substantially one type of linearly polarized light.

The problem with the polarization conversion system of the prior art is the need to use a complex polarization splitting prism array including multiple polarization beam splitters and reflecting mirrors in order to effect the conversion of the unpolarized light to the two types of linearly polarized light.

SUMMARY OF THE INVENTION

The object of the present invention is therefore to provide a polarization conversion system having a simpler structure than the conventional ones, and an optical system that uses this polarization conversion system.

At least part of the above and the other related object are attained by a polarization conversion system that converts unpolarized light to light of a specific polarization. The polarization conversion system comprises: a polarized light selective reflector that separates incident unpolarized light into first and second types of polarized light, transmits the first type of polarized light and reflects the second type of polarized light, a relay optical system that relays an incident light beam onto the polarized light selective reflector, a polarized light reflector, disposed on an optical path of a reflected light beam reflected by the polarized light selective reflector, that reflects the reflected light beam back to the polarized light selective reflector while converting the second type of polarized light to polarized light of the first type.

In accordance with the above structure, a polarization conversion system having a simpler structure than previous ones can be achieved.

In accordance with the polarization conversion system, it is preferable that the relay optical system includes: a first lens array having a plurality of first small lenses that divides an incident light beam into a plurality of partial light beams, and a relay lens array, disposed on a light emission side of the first lens array, having a plurality of relay lenses corresponding to the plurality of first small lenses. The second lens array is positioned in proximity to entry side of the polarized light selective reflector so that each of reflected partial light beams that exit the second small lenses and are reflected by the polarized light selective reflector is reflected back to the same second small lens from which each of the partial light beams exited prior to being reflected by the polarized light selective reflector. Each of the plurality of relay lenses is located at an each specified position that is in proximity to an exit side focal point of the corresponding first small lens and to an entry side focal point of the corresponding second small lens, and the corresponding first small lens and the corresponding second small lens are located at conjugate points of the relay lens. The polarized light reflector includes a plurality of polarized light reflection portions, disposed on optical paths of a plurality of reflected partial light beams exiting from the plurality of second small lenses, each reflects a corresponding reflected partial light beam and converts the second type of polarized light within the corresponding reflected partial light beam to polarized light of the first type, and a plurality of third small lenses that direct reflected partial light beams reflected by the polarized light reflection portions to go back to the same second small lenses from which the reflected partial light beams exited prior to being reflected by the polarized light reflection portions.

Thus using a the first lens array to divide the incident light beam into a plurality of partial light beams and condense the beams makes it possible to keep the partial light beams small, thereby also enabling the size of the relay lenses to be set to a correspondingly small size. Moreover, the polarization conversion system can be disposed using the spaces between the relay lenses. In addition, the polarized light reflection portions are arranged so that they reflect incident light from the second lens array back to the second lens array, which ensures that the light beam incident on the polarization conversion system can be converted to one type of polarized light and emitted with hardly any change to the size of the incident beam.

Moreover, the relay optical system includes a relay lens array, which makes it possible to also project onto the second lens array partial light beams from the first lens array, thereby increasing the light utilization efficiency.

Here, it is preferable that the plurality of polarized light reflection portions are each positioned in proximity to a focal point of a corresponding second small lens, and the plurality of third small lenses each has a focal distance substantially equal to that of corresponding the second small lenses and are disposed in proximity to a corresponding polarized light reflection portion.

This provides a further improvement in the light utilization efficiency.

In accordance with above configurations, it is preferable that the first and second types of polarized light are first and second types of linearly polarized light having mutually orthogonal polarization planes, and each of the plurality of polarized light reflection portions includes a reflecting mirror and a λ/4 retardation film positioned between the third small lenses and the reflecting mirror.

It is almost preferable that the first and second types of polarized light are first and second types of circularly polarized light circularly polarized in reverse rotations and the plurality of polarized light reflection portions are reflecting mirrors.

In this configuration, the polarization conversion system may further comprise a λ/4 retardation film that converts the first type of circularly polarized light transmitted by the polarized light selective reflector to a predetermined type of linearly polarized light.

In each case, incident unpolarized light can be converted to one type of polarized light.

The present invention is also directed to an illumination system for illuminating a prescribed illumination region. The illumination system comprises: a polarization conversion system according to any one of the above polarization conversion systems of the invention, and a light source that emits a light beam toward the polarization conversion system.

Since the illumination system uses the above-described polarization conversion system of the invention, when an electro-optical device is employed that utilizes specific polarized light, such as a liquid crystal panel, the light utilization efficiency can be improved.

In accordance with the illumination system, it is preferable that the illumination system further comprises a superposition lens that divides a light beam from the polarization conversion system into a plurality of partial light beams and superposes the plurality of partial light beams onto the illumination region.

This arrangement provides illumination light having uniform brightness and colors.

The present invention is further directed to a first projector for displaying projected images. The first projector comprises: an illumination system according to any one of the above illumination systems, an electro-optical device that modulates light emitted from the illumination system, and a projection optical system that projects light thus modulated by the electro-optical device onto a projection surface.

Since the illumination system according to the first embodiment of the invention uses the polarization conversion system of the invention, it is possible to obtain projection images having uniform brightness.

In accordance with the first projector, it is preferable that a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with a direction of tilted projection by the projection optical system.

In accordance with this arrangement, the light exiting the polarization conversion system is caused to fall efficiently on the projection system, improving the brightness of the projected images.

In this configuration, it is preferable that the transmitted light beam is inclined in a direction that substantially coincides with the direction of tilted projection by the projection optical system.

Transmitted light beams usually have a higher intensity than reflected light beams. In accordance with the above arrangement, transmitted light beams can be caused to fall efficiently on the projection system, further improving the brightness of projected images.

The present invention is also directed to by a second projector for displaying projected images. The second projector comprises: an illumination system according to any one of the above illumination systems, a color separator that separates light emitted from the illumination system into a plurality of color components, a plurality of electro-optical device each modulate light of each color component separated by the color separator, a color combiner for combining light of each color component thus modulated by the electro-optical device, and a projection optical system that projects light thus combined by the color combiner onto a projection surface.

Since the illumination system according to the second embodiment of the invention uses the polarization conversion system of the invention, it is possible to obtain projection images having uniform brightness.

In accordance with the second projector, it is preferable that, assuming x, y, z as three mutually orthogonal directional axes where z is a direction parallel to an optical axis of light emerging from the illumination system, the color separator has a color separation surface that, is substantially perpendicular to plane xz and forms a prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction y.

The color separating characteristics of the color separator have a high dependency on the angle of light incidence, and the dependency is higher in the color separating direction than at right-angles thereto. In accordance with the above system configuration the direction in which the transmitted and reflected beams are arrayed (combined) is substantially perpendicular to the direction in which color separation takes place in the color separation plane of the color separator. Thus, the angle of divergence (the degree of angular spread) of the incident beam on the color separation surface can be made relatively small in the color separation direction having the higher incident angle dependency. This decreases color deviation in the light of each color component coming from the color separator system, resulting in projected images of uniform brightness.

It is almost preferable that,assuming x, y, z as three mutually orthogonal directional axes where z is a direction parallel to an optical axis of light emerging from the illumination system, the color combiner has a color combining surface that is substantially perpendicular to plane xz and forms a prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction y.

As in the color separator, the color combining characteristics of the color combiner exhibit a high dependency on the angle of incidence, with the dependency being higher in the color combining direction than at right-angles thereto. In accordance with the above system configuration the direction in which the transmitted and reflected beams are arrayed (combined) is substantially perpendicular to the direction in which the color components are combined in the color combining plane of the color combiner. Again, therefore, the angle of divergence (the degree of angular spread) of the incident beam on the color combining surface can be made relatively small in the color combining direction having the higher incident angle dependency, decreasing color deviation in the light of each color component coming from the color separator and thereby resulting in projected images of uniform brightness.

The present invention is further directed to a third projector for displaying projected images. The third projector comprises: an illumination system according to any one of the above illumination systems, a reflecting type electro-optical device that modulates incident light in accordance with received image information while reflecting the modulated light, a projection optical system that projects light received from the reflecting type electro-optical device onto a projection surface, a polarization splitter that spatially separates into different directions first polarized light entering the reflecting type electro-optical device from the illumination system and second polarized light entering the projection optical system from the reflecting type electro-optical device, in accordance with differences in polarization characteristics therebetween.

The illumination system according to the third embodiment uses the polarization conversion system of the invention, resulting in projection images having uniform brightness.

In accordance with the third projector, it is preferable that, assuming x, y, z as three mutually orthogonal directional axes where z is a direction parallel to an optical axis of light emerging from the illumination system, the polarization splitter has a polarized light separation surface that is substantially perpendicular to plane xz and forms a prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction x.

The polarization splitting characteristics of the polarization splitter have a high dependency on the angle of light incidence. The optical characteristics of the polarization splitting surface can be used to reduce the degree of this dependence in the polarization splitting direction. However, because the degree of dependency at right-angles to the polarization splitting direction is determined by the geometrical relationship between the polarization splitting surface and the light beam incident thereon, achieving such reduction is very difficult. When light falling incident on the polarization splitting surface has an inclination in the z direction with respect to the yz plane, it gives rise to a pronounced rotation of the polarization axis, decreasing the light utilization efficiency with respect to the electro-optical device. By employing the above arrangement of this invention, the direction in which the transmitted and reflected light beams are arrayed (combined) is substantially the same as the direction in which the polarized light is split in the polarization splitter. This means that the dependency on the angle of incidence can be readily reduced by improving the optical characteristics of the polarization splitting surface, thereby making it possible to prevent deterioration in the light utilization efficiency. This makes it possible to achieve brighter projected images having a higher contrast.

The present invention is also directed to a fourth projector for displaying projected images. The fourth projector comprises: an illumination system according to any one of the above illumination systems, an electro-optical device that includes a plurality of pixels each including a plurality of sub-pixels corresponding to light of each of a plurality of color components and a condenser optical system comprising a plurality of small condenser elements corresponding to each pixel. The electro-optical device modulates light at each pixel responsive to given image information. The fourth projector further comprises a color separator that separates light emerging from the illumination system into a plurality of color components and also directs the plurality of color components in mutually different directions to impinge on the plurality of sub-pixels corresponding thereto, and a projection optical system that projects light of each color component thus modulated by the electro-optical device onto a projection surface.

The illumination system according to the fourth embodiment uses the polarization conversion system of the invention, providing projection images having uniform brightness.

In accordance with the fourth projector, it is preferable that, assuming x, y, z as three mutually orthogonal directional axes where z is a direction parallel to an optical axis of light emerging from the illumination system, the color separator has a plurality of color separation surfaces for selectively separating light into a plurality of colors that is substantially perpendicular to plane xz and forms a different prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction y.

The color separating characteristics of the color separator exhibit a high dependency on the angle of light incidence, and this dependency is higher in the color separating direction than at right-angles thereto. In accordance with the above system configuration the direction in which the transmitted and reflected beams are arrayed (combined) is substantially perpendicular to the direction in which color separation takes place in the color separation plane of the color separator. Thus, the angle of divergence (the degree of angular spread) of the incident beam on the color separation surface can be made relatively small in the color separation direction in which the incident angle dependency is higher. By decreasing color deviation in the light of each color component coming from the color separator, this results in projected images of uniform brightness.

It is preferable that a transmitted light beam transmitted by the polarized light selective reflector and a reflected light beam that is reflected by the polarized light selective reflector and is also reflected by the polarized light reflector to again fall incident on the polarized light selective reflector are combined in the polarized light selective reflector in a direction that is perpendicular to a direction in which are aligned the plurality of sub-pixels included in each pixel.

In this electro-optical device the sub-pixels are elongated in shape. Therefore, unless the light beam of each color component is tightly focused by the small condenser elements to fall incident precisely on the corresponding to each pixel, these color components will also fall incident on adjacent, non-corresponding sub-pixels, degrading the quality of the projected images. There is an inverse relationship between beam divergence angle and beam condensing properties, meaning that a light beam having a large angle of divergence (i.e., poor parallelism) cannot be condensed into a small, tightly-focussed beam. By employing the above-described arrangement according to this invention, the direction in which the transmitted and reflected light beams are arrayed (combined) is perpendicular to the direction in which the sub-pixels of a pixel are aligned (along the longer sides of the sub-pixels). By utilizing the particular shape of the sub-pixels, this makes it possible to cause the light beam of each color component to fall incident just on the corresponding sub-pixel, without having to focus the light to a finer beam than necessary. The result is the achievement of high-quality projected images exhibiting high brightness and contrast.

These and other objects, features, aspects, and advantages of the present invention will become more apparent from the following detailed description of the preferred embodiments with the accompanying drawings.

BRIEF DESCRIPTION OF THE DRAWINGS

FIG. 16(A) and 16(B) are enlarged depictions of one pixel configuration of the single-panel type color liquid crystal light valve 520.

DESCRIPTION OF THE PREFERRED EMBODIMENTS

Embodiments of the present invention will now be described with reference to the drawings. In each of the following embodiments, unless stated otherwise, the direction of light propagation is set along z axis (the direction parallel to the optical axis), and when an observer is facing the direction of light propagation, his twelve o'clock direction is taken as y axis (the vertical direction) and his three o'clock as x axis (horizontal direction).

Figure 1:
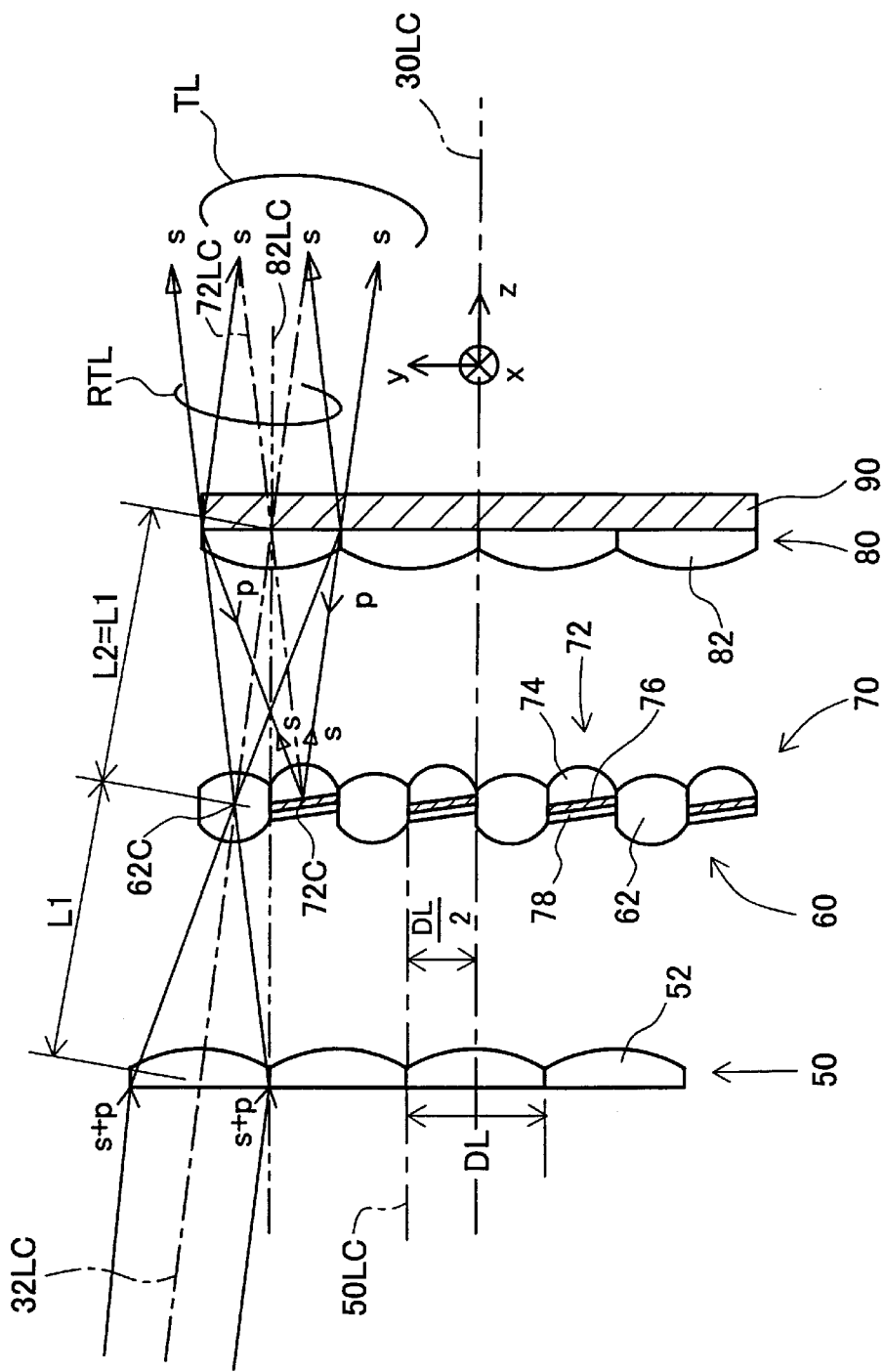
FIG. 1 is a side view showing the general configuration of main parts of a polarization conversion system of the invention.

A. First embodiment:

FIG. 1 is a side view showing the general configuration of main parts of a polarization conversion system of the invention. The polarization conversion system 30 includes a first lens array 50, a relay lens array 60, a polarized light reflector array 70, a second lens array 80 and a polarized light selective reflection plate 90. The relay lens array 60 and polarized light reflector array 70 are formed as one unit. The system (polarization conversion system) optical axis 30LC is arranged to be parallel to the z axis.

Figure 2:
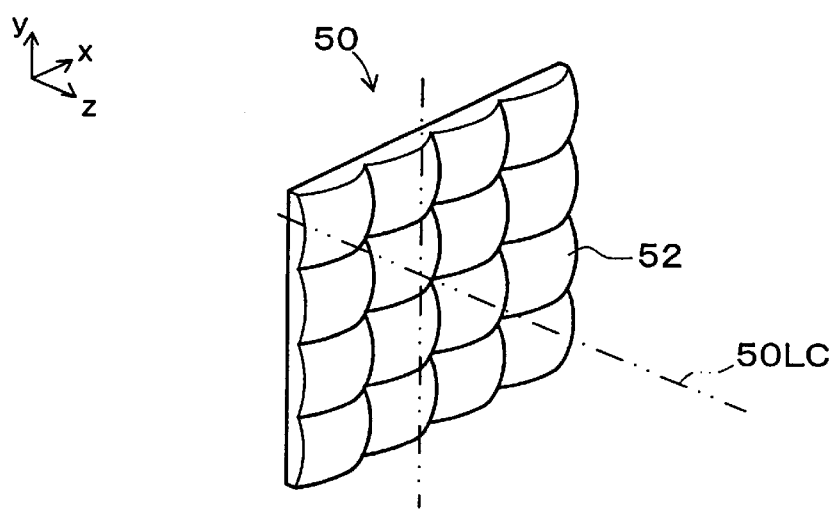
FIG. 2 is a perspective view of the first lens array 50.

FIG. 2 is a perspective view of the first lens array 50. The first lens array 50 is arranged as a matrix of M rows and N columns of plano-convex first small lenses 52 that have the contour of a substantially rectangular shape. The first lens array is arranged parallel to the xy plane. In the example shown in FIG. 2, M=4 and N=4. The second lens array 80 shown in FIG. 1 is also arranged as a matrix of M rows and N columns of plano-convex second small lenses 82 corresponding to the first small lenses 52 of the first lens array 50. The second lens array 80 is positioned substantially parallel to the xy plane so that the system optical axis thereof substantially coincides with the system optical axis 30LC. The first lens array 50 is positioned with the system optical axis 50LC thereof offset from the system optical axis 30LC in the +y direction by an amount equivalent to half the width DL of a first small lens 52 in the y direction. The rectangular shape of the small lenses of the first and second lens arrays 50 and 80 is not limitative, and may instead be hexagonal, for example. It is desirable for the small lenses to be of such a shape that allows the lenses to be arrayed close together. At the same time, it is not essential that the first small lenses 52 be positioned close together. However, from the standpoint of the light utilization efficiency, it is preferable that the lenses be close together. These points also apply to the second lens array 80.

The polarized light selective reflection plate 90 is adhered to the exit surface of the second lens array 80. As the polarized light selective reflection plate 90, there may be used a reflecting type polarization plate that transmits one of the two linearly polarized light components having mutually orthogonal polarization planes, and reflects the other linearly polarized light component. The RDF-C made by 3M Company, for example, can be used for the reflecting type polarization plate. In this first embodiment, a reflecting type polarization plate is used that transmits the s polarized light component and reflects the p polarized light component. The polarized light selective reflection plate 90 may be spaced apart from the second lens array 80, but for the sake of light utilization efficiency, it is preferable for the polarized light selective reflection plate 90 to be adhered to the exit surface of the second lens array 80.

The relay lens array 60 includes biconvex relay lenses 62 arranged in a matrix of M rows and N columns. Each relay lens 62 is positioned at the optical midpoint of the line of central axis 32LC connecting the center of a first small lens 52 with the center of the corresponding second small lens 82.

The polarized light reflector array 70 includes a plurality of polarized light reflecting portions 72 arranged in a matrix of M rows and N columns. Each of the polarized light reflecting portions 72 includes a plano-convex third small lens 74, a λ/4 retardation film 76 adhered to the flat exit surface of the third small lens 74, and a reflecting mirror 78 adhered to the λ/4 retardation film 76. Each polarized light reflecting portion 72 is arranged at an angle so that a normal line (axis) 72LC passing from the center of the reflecting mirror 78 through the center of a third small lens 74 also passes through the center of a second small lens 82. Also, the center 62C of each relay lens 62 and the center 72C of each reflecting mirror 78 are located symmetrically along the y axis with respect to the axis 82LC of the second small lenses 82. If the lens characteristics of the third small lenses 74 are modified, the polarized light reflecting portions 72 can be set parallel to the xy plane instead of at angle. This is explained later.

Figure 3A:
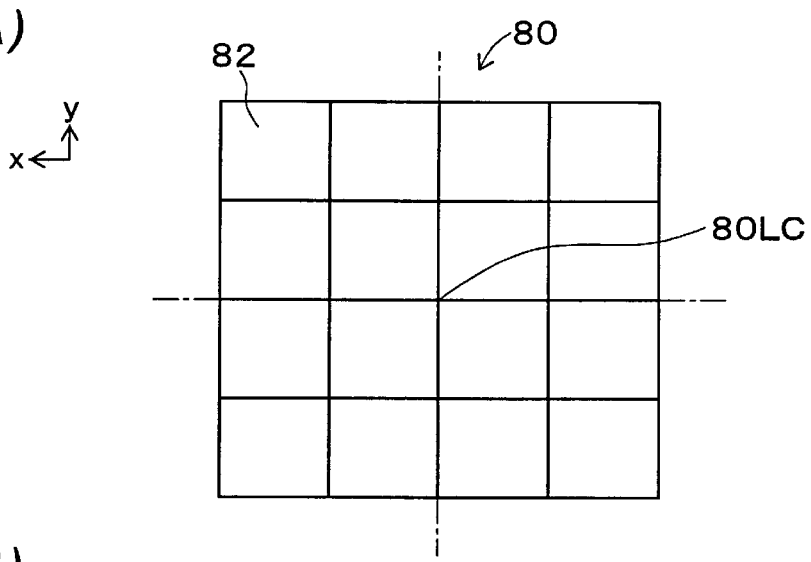
FIGS. 3(A) and 3(B) are front views showing how the second lens array 80, relay lens array 60 and polarized light reflector array 70 are related.
Figure 3B:
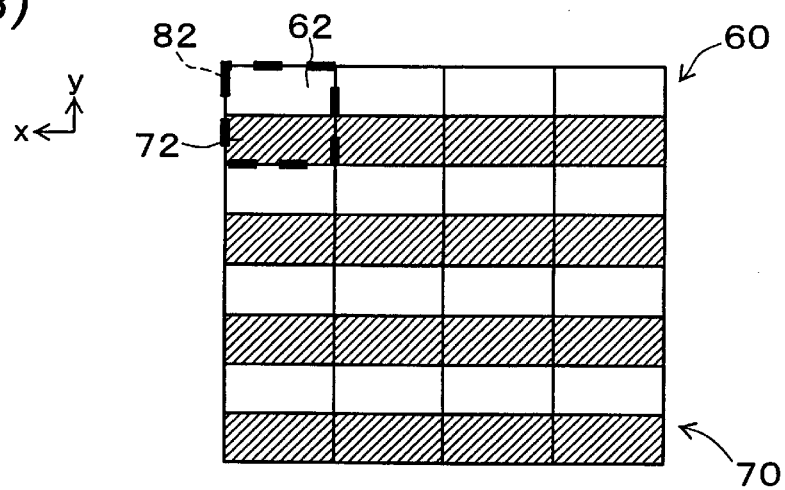

FIGS. 3(A) and 3(B) are front views showing how the second lens array 80, relay lens array 60 and polarized light reflector array 70 are related. As shown in FIG. 3(B), the relay lens array 60 and polarized light reflector array 70 are arranged so that the polarized light reflecting portions 72 and the relay lenses 62 appear alternately in the y direction. There is one second small lens 82, shown in FIG. 3(A), for each pair of one relay lens 62 and one polarized light reflecting portion 72 adjacent in the y direction. Thus, a relay lens 62 and a polarized light reflecting portion 72 are each about the same size as a second small lens 82 in the x direction, and about half the size in the y direction.

As shown in FIG. 1, the distance between the first small lenses 52 and the relay lenses 62 is denoted as L1 and the distance between the relay lenses 62 and the second small lenses 82 as L2. The focal distance f1 of the first small lenses 52 is set to be the same as distance L1 and the focal distance f2 of the second small lenses is set to be the same as distance L2. While it is not an essential requirement that L1 and L2 be the same, in this embodiment they are the same. The focal distance fr of the relay lenses 62 is set so that the positions of the first small lenses 52 and the second small lenses 82 are conjugate points of the relay lenses 62. That is, fr=(L1×L2)/(L1+L2). In this embodiment, since L1=L2, fr=L1×½. The focal distance of the third small lenses 74 is set to the distance L2 between the third small lenses 74 and the second small lenses 82. However, the focal distance of the third small lenses 74 can be set in accordance with the degree of parallelism of the light beam incident on the polarization conversion system 30, the properties of other optical elements downstream of the polarization conversion system 30, and so forth. Also, the third small lenses 74 can be omitted if the parallelism of the incident beam is high.

The relay lens array 60 and polarized light reflector array 70 can be fabricated as described below. First, the matrices of the relay lenses 62 and third small lenses 74 are formed by integral moulding. Then, the λ/4 retardation film 76 and reflecting mirror 78 are adhered to the flat surface of the third small lenses 74.

A beam of unpolarized light falling incident on the first lens array 50 substantially parallel to the central axis 32LC through the small lenses 52, 62 and 82 is divided into a plurality of partial light beams having a shape substantially the same as that of the first small lenses 52. The small lenses 52 converge each of the partial light beams to form an image in the corresponding relay lens 62, and the light beams diverge from there to fall incident on the second small lenses 82. The shape of the partial light beams incident on the second small lenses 82 is substantially the same as the shape at incidence on the first small lenses 52 (although rotated by 180 degrees about axis 32LC). From the second lens array 80, the plurality of partial light beams exit substantially parallel to the axis 32LC.

From the second lens array 80, the partial light beams fall incident on the polarized light selective reflection plate 90 and are each separated into s and p polarized light components. The s polarized light beams pass on through, and exit, while each p polarized partial light beam is reflected back to fall incident on a corresponding polarized light reflecting portion 72, where it is reflected by the reflecting mirror 78 and passes back through the second lens array 80 to the polarized light selective reflection plate 90.

In this process, the partial light beam passes through the λ/4 retardation film 76 twice when reflected by the reflecting mirror 78. The polarization axis of λ/4 retardation film 76 is set at an angle of 45 degrees relative to the p polarized light. Thus, in their passage through the λ/4 retardation film 76, the p polarized light is converted to s polarized light, which is then transmitted by the polarized light selective reflection plate 90.

If the light beam entering the first lens array 50 is an ideally parallel beam parallel with the central axis 32LC, the relay lenses 62 and third small lenses 74 may not be required. However, effecting incidence of an ideally parallel beam is very difficult. When there are no relay lenses 62, there may be some light from the first small lenses 52 that cannot enter the second small lenses 82, or light from the second small lenses 82 that cannot enter the third small lenses 74. Such a situation is undesirable, since it degrades the light utilization efficiency of the polarization conversion system 30. The focal distance of the relay lenses 62 is set so that the first small lenses 52 and the second small lenses 82 are located at conjugate points of the relay lenses 62. Also, the focal distance of the third small lenses 74 is set to be the same as the distance L2 between the third small lenses 74 and the second small lenses 82. Accordingly, even if the light beam incident on the first lens array 50 is not parallel to the axis 32LC, the refractive power of the relay lenses 62 makes it possible to increase the intensity of the light passing through the second small lenses 82. Also, the refractive power of the third small lenses 74 enables virtually all of the light reflected by the polarized light selective reflection plate 90 out through the second small lenses 82 to be returned to the selective reflection plate 90 via the second small lenses 82, increasing the light utilization efficiency of the polarization conversion system 30.

Of the beams of light that fall incident on the first lens array 50 substantially parallel to the central axis 32LC of the small lenses 52, 62 and 82, transmitted light TL that is transmitted by the polarized light selective reflection plate 90 exits in a direction substantially parallel to the center line 32LC (inclined in the −y direction). On the other hand, light RTL (reflected transmitted light) that after being reflected by the polarized light selective reflection plate 90 and the polarized light reflector array 70 is transmitted by the selective reflection plate 90 exits in the +y direction that is symmetrically opposite to that of the transmitted light TL, relative to the center line 32LC, i.e., inclined in the y direction. As such, the angular spread of light included in the beams exiting the polarization conversion system 30 is greater than that of light entering the polarization conversion system 30. Therefore when using this polarization conversion system 30 in an optical apparatus, it is desirable to set the other optical systems taking this angular spread into account.

In accordance with the foregoing, the polarization conversion system 30 is able to efficiently convert the incident unpolarized light to one type of linearly polarized light. Moreover, there is no need for the type of complex polarization splitting prism array used in the conventional arrangement. Instead, the polarization conversion optical system is a simple one comprising just the selective reflection plate 90, λ/4 retardation film 76, and reflecting mirror 78. Since in this polarization conversion system 30, also, the light beam incident on the first lens array 50 is divided into a plurality of partial light beams and the partial light beams each condensed, the size of each partial light beam in the relay lens array 60 can be kept small, so the relay lenses 62 can also be set at a correspondingly small size. In addition, the polarized light reflecting portions 72 can be positioned in the spaces between the relay lenses 62. Specifically, the size of a relay lens 62 and associated polarized light reflecting portion 72 can be set to be the same size as a second small lens 82. The polarization conversion system 30 therefore can be made very thin by increasing the number of the divisions of the relay lens array 60 and second lens array 80. Also, the positioning of the polarized light reflecting portions 72 to reflect the light back to the second small lenses 82 permits the conversion to linearly polarized light to be effected with virtually no increase in the size of a light beam compared to the size of the beam incident on the polarization conversion system 30.

The first lens array 50, relay lens array 60 and second lens array 80 constitute the relay optical system of the claimed invention, and the polarized light reflector array 70 constitutes the polarization conversion system of the claimed invention.

Although this embodiment has been described with reference to a configuration where each of the partial light beams exiting the second lens array 80 is formed into a parallel beam, this is not limitative. Even without the system being configured to render beams exiting the second lens array 80 parallel, the polarization conversion system 30 can still convert the incident unpolarized light to one type of linearly polarized light. In such a case, however, it is preferable for the each polarized light reflecting portion 72 to be located at a position at which the partial light beams reflected by the polarized light selective reflection plate 90 and exiting the second lens array 80 can each be condensed.

Figure 4A:
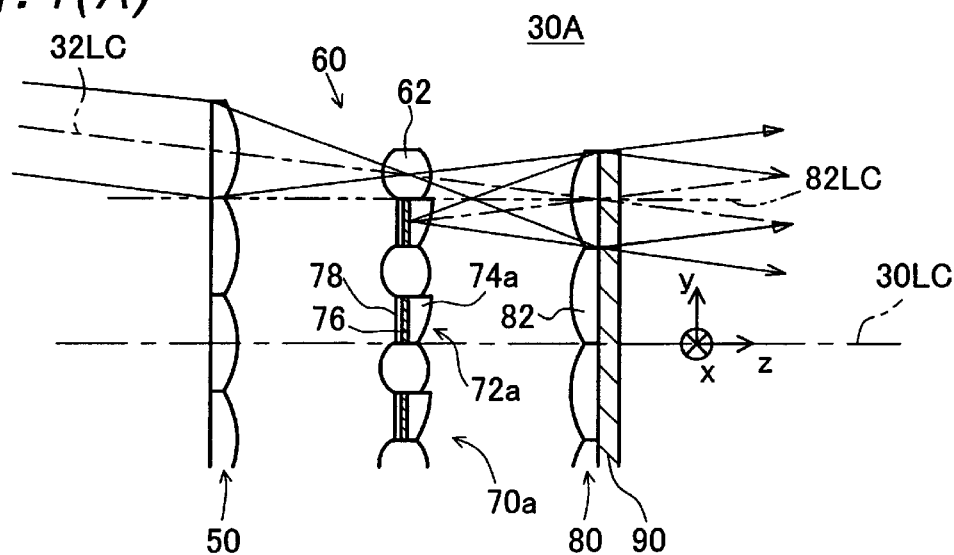
FIGS. 4(A) through 4(C) show variations of the polarization conversion system 30.

The polarization conversion system 30 can be modified in various ways, described below. FIG. 4(A) shows a variation of the polarized light reflector array 70. In this polarized light reflector array 70a the polarized light reflection portions 72a include third small lenses 74a that are eccentric lenses. In the polarized light reflecting portions 72 shown in FIG. 1, the λ/4 retardation films 76 and reflecting mirrors 78 are inclined to the system optical axis 30LC. In the configuration shown in FIG. 4(A), the third small lenses 74a are eccentric lenses, so the □/4 retardation film 76 and reflecting mirror 78 can be disposed substantially perpendicular to the system optical axis 30LC. This configuration makes the polarized light reflector array 70a easier to fabricate.

Figure 4B:
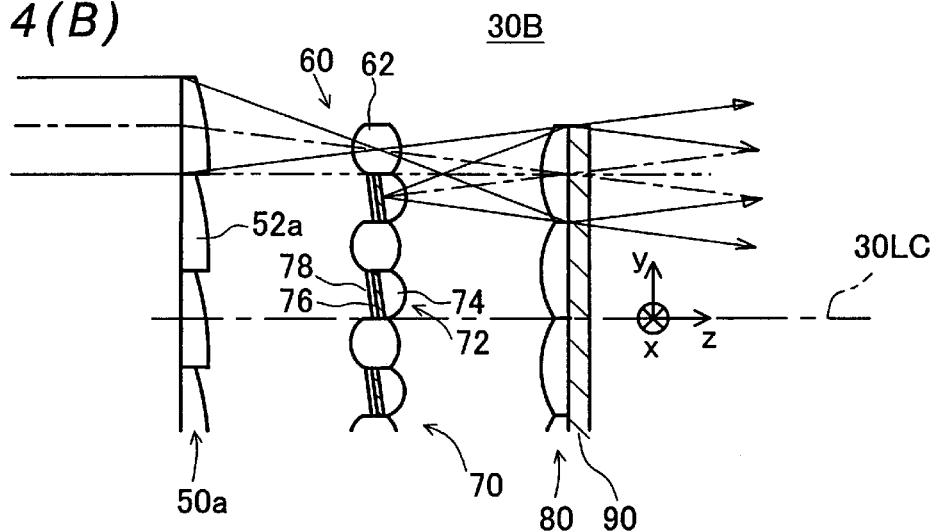

FIG. 4(B) shows a variation of the first lens array 50. This first lens array 50a includes a plurality of first eccentric small lenses 52a that divide parallel light flux substantially parallel to the system optical axis 30LC into a plurality of partial light beams and directs the beams onto the second lens array 80. Instead of the first lens array 50a, the first lens array 50 of FIG. 4(A) can be used with a deflection prism provided at the incident or exit side of the first lens array 50. In this case too, a parallel light flux incident on the lens array 50, substantially parallel to the system optical axis 30LC, could be divided to fall incident on appropriate positions of the polarization conversion system. This configuration facilitates the arrangement of the light source lamp and other optical elements used with the polarization conversion system.

Figure 4C:
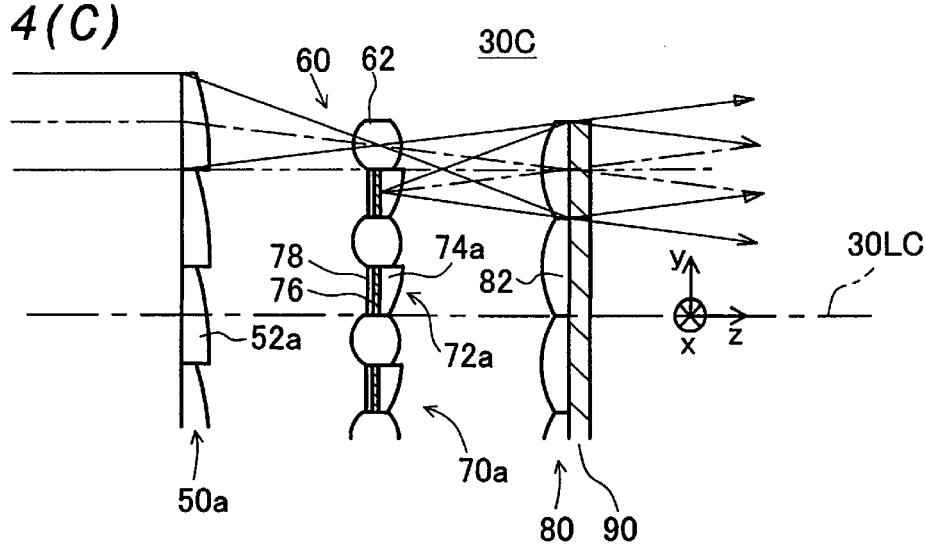

The arrangement of FIG. 4(C) uses the polarized light reflector array 70a of FIG. 4(A) and the first lens array 50a of FIG. 4(B).

Figure 5A:
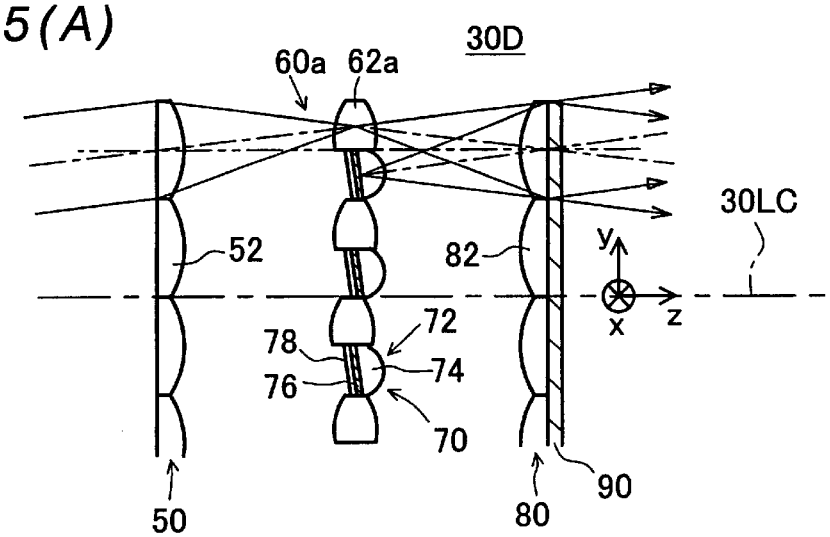
FIGS. 5(A) through 5(C) show variations of the polarization conversion system 30.

FIG. 5(A) shows a variation of the relay lens array 60. This relay lens array 60a includes a plurality of relay lenses 62a that are eccentric lenses. From a comparison with FIG. 1, it can be seen that in the case of FIG. 5(A) the position of the first lens array 50 on the y axis is the same as that of the second lens array 80. The partial light beams go from the first small lenses 52 to the corresponding relay lenses 62a to be directed to the corresponding second small lenses 82. In order to utilize a parallel light flux parallel to the system optical axis 30LC, the first lens array 50a of eccentric first small lenses as shown in FIG. 4(B) may be employed in the structure of FIG. 5(A). Alternatively, a deflection prism may be provided at the incident or exit side of the first lens array 50. Also, the polarized light reflector array 70a of FIG. 4(A) may be used instead of the polarized light reflector array 70, with the λ/4 retardation films 76 and reflecting mirrors 78 being disposed perpendicular to the system optical axis 30LC. This configuration facilitates the arrangement of the light source lamp and other optical elements used with the polarization conversion system.

Figure 5B:
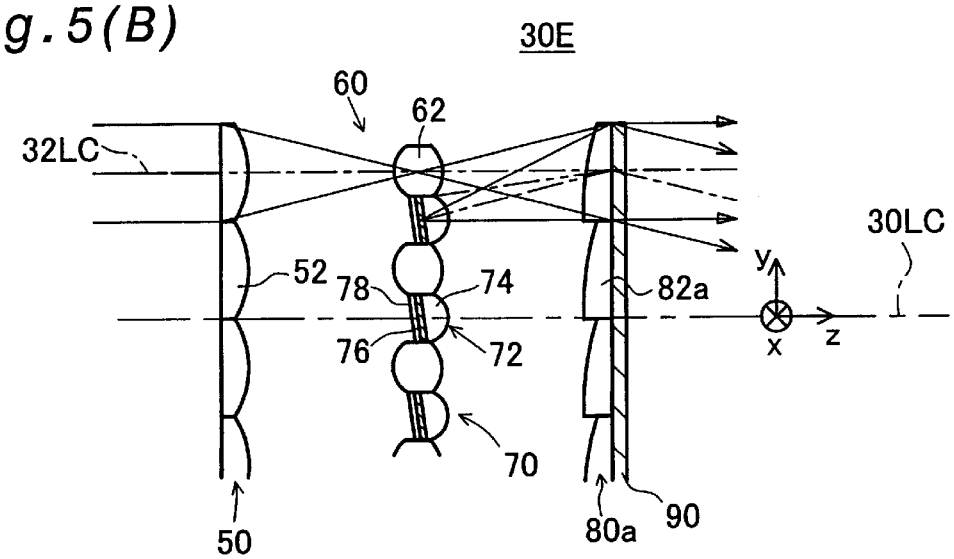

FIG. 5(B) shows a variation of the second lens array 80. This second lens array 80a includes second small lenses 82a that are eccentric lenses. The first small lenses 52, relay lenses 62 and second small lenses 82a are positioned so that the central axis 32LC thereof is parallel to the system optical axis 30LC. Light reflected by the polarized light selective reflection plate 90 is directed to the polarized light reflecting portions 72 by the second small lenses 82a. In this arrangement too, the polarized light reflector array 70a of FIG. 4(A) may be used instead of the polarized light reflector array 70, with the λ/4 retardation films 76 and reflecting mirrors 78 being disposed perpendicular to the system optical axis 30LC. This configuration facilitates the arrangement of the light source lamp and other optical elements used with the polarization conversion system.

Figure 5C:
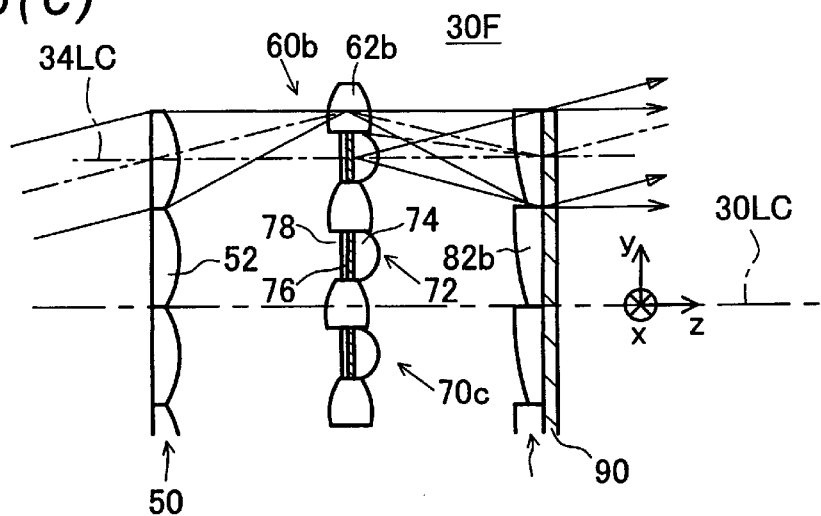

FIG. 5(C) shows a variation of the second lens array 80 and relay lens array 60. The relay lens array 60b includes a plurality of eccentric relay lenses 62b, and the second lens array 80b includes of a plurality of eccentric second small lenses 82b. The polarized light reflecting portions 72 constituting the polarized light reflector array 70c are each disposed with the central axis thereof parallel to the system optical axis 30LC. The first small lenses 52, polarized light reflecting portions 72 and second small lenses 82b are positioned with the central axis 34LC thereof parallel to the system optical axis 30LC. Partial light beams exiting from the first small lenses 52 are directed to the corresponding second small lenses 82b by the relay lens array 60b. Light reflected by the polarized light selective reflection plate 90 is directed back to the polarized light reflecting portions 72 by the second small lenses 82b. As the arrangement for directing a light beam parallel to the system optical axis 30LC into the polarization conversion system 30, the first lens array 50a of eccentric first small lenses as shown in FIG. 4(B) may be employed in the structure of FIG. 5(c). Alternatively, a deflection prism may be provided at he incident side of the first lens array 50.

In each of the above variations 30A to 30F, as in the polarization conversion system 30, unpolarized light can be efficiently converted to one type of linearly polarized light using a simpler configuration than the conventional one.

Figure 6:
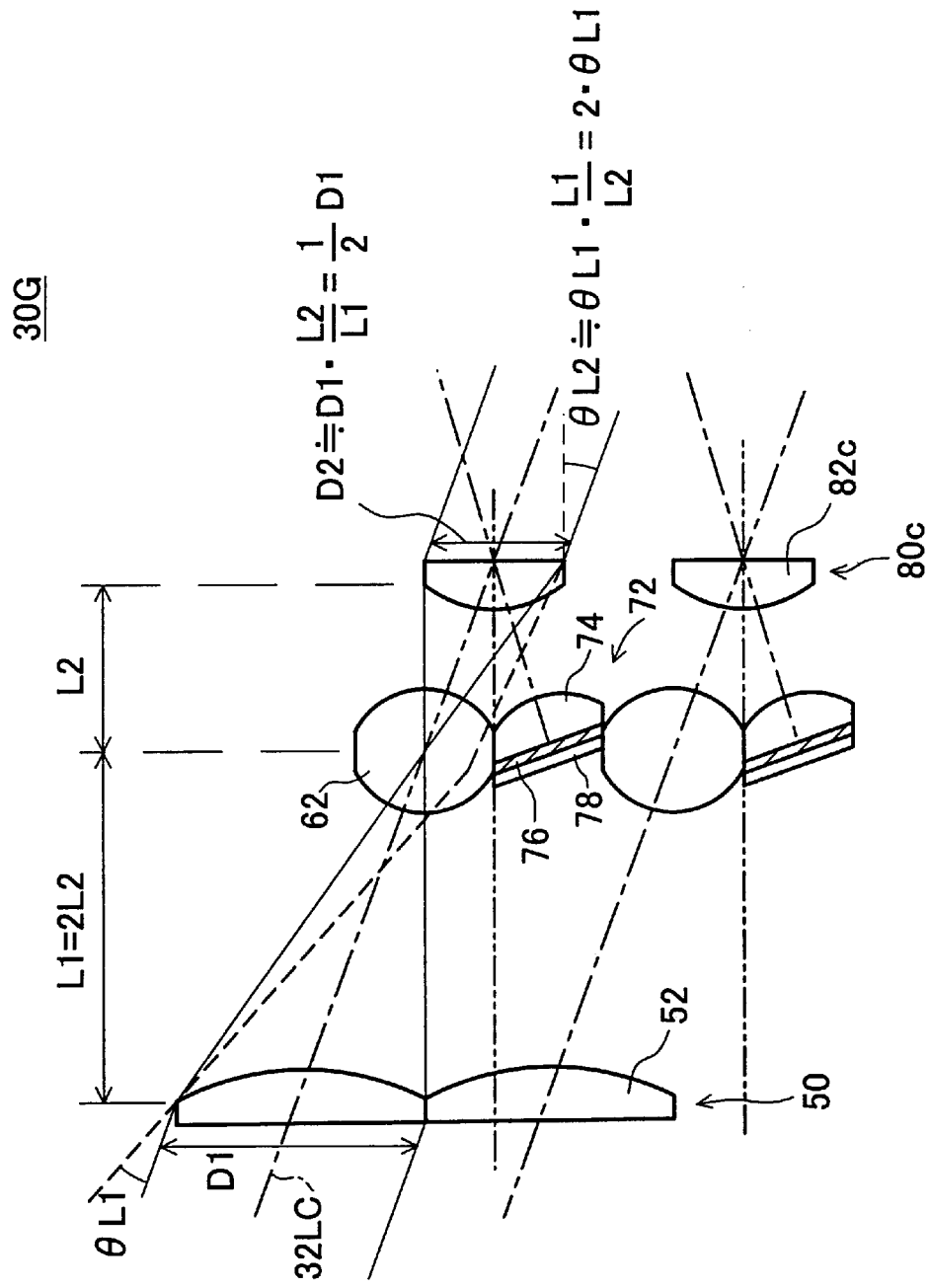
FIG. 6 shows a configuration in which the optical distance L1 between the first small lenses 52 and the relay lenses 62 is set to be twice the optical distance L2 between the relay lenses 62 and the second small lenses 82.

In the polarization conversion system 30 of FIG. 1, the optical distance L1 between the first small lenses 52 and the relay lenses 62 is set to be the same as the optical distance L2 between the relay lenses 62 and the second small lenses 82. However, L1 and L2 can be set different from each other. FIG. 6 shows an arrangement in which distance L1 is twice as long as distance L2. This configuration also enables unpolarized light to be converted to one type of linearly polarized light using a simple structure.

The width D2 of a partial light beam on the incident surface of a second small lens 82c is substantially half (L2/L1) the width D1 of the partial light beam on the incident surface of a first small lens 52. Therefore, each second small lens 82c only has to be large enough to accommodate the incident light beam. A partial light beam (indicated by the dashed line) falling incident at an angle θL1 to the central axis 32LC through the small lenses 52, 62 and 82c exits from the second small lens 82c at an angle θL2 to the central axis 32LC that is larger than angle θL1 ($\cong$θL1×L1/L2=2 θL1). As a result, the angular spread of a light beam exiting from a second small lens 82c is more extensive than that of the beam incident on the first lens array 50. Therefore when applying this polarization conversion system 30 in an optical apparatus, it is desirable to set the other optical systems based on a consideration of this angular spread. This is explained in further detail below.

Each of the variations described above can also be applied to the other embodiments described below.

Figure 7:
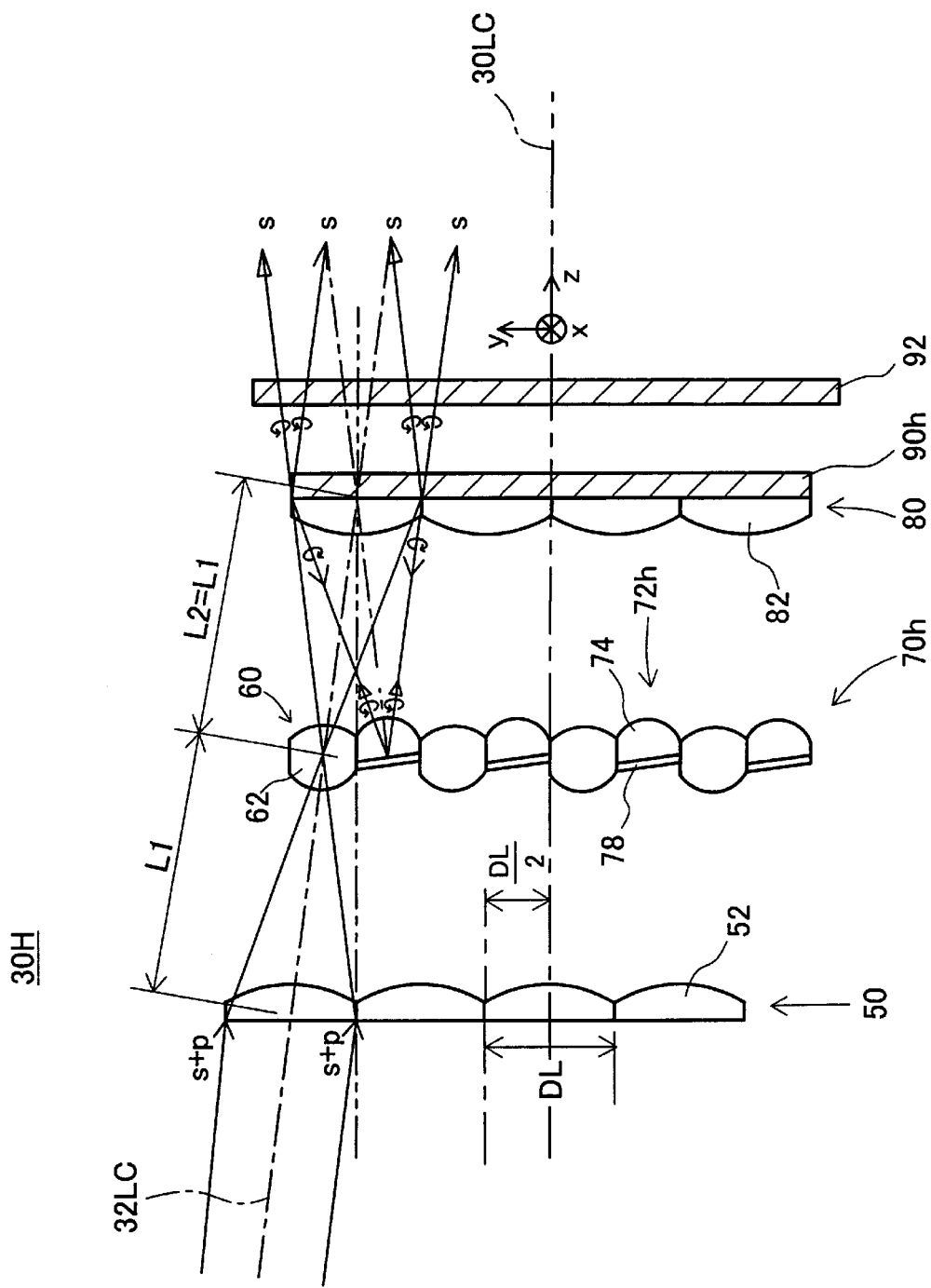
FIG. 7 is a side view of the general configuration of main parts of another polarization conversion system according to the invention.

B. Second embodiment:

FIG. 7 is a side view of the general configuration of main parts of another polarization conversion system according to the invention. In place of the polarized light selective reflection plate 90 and the polarized light reflector array 70 of the polarization conversion system 30 of FIG. 1, this polarization conversion system 30H has corresponding elements 90h and 70h having a different configuration. In this example a λ/4 retardation film 92 is provided on the exit side of the polarized light selective reflection plate 90h. The positional arrangement of each of the elements is the same as in the polarization conversion system 30.

The polarized light selective reflection plate 90h transmits one type of circularly polarized light and reflects the other type. The selective reflection plate 90h can be formed of cholesteric liquid crystal or chiral smetic liquid crystal. By controlling the crystal alignment, a given type of refractive index distribution can be imparted to these liquid crystals to achieve the above functions.

The polarized light reflector array 70h does not have the λ/4 retardation films 76 used on the polarized light reflecting portions 72 in the arrangement of FIG. 1. Instead, it is formed of a plurality of polarized light reflection portions 72h including third small lenses 74 and reflecting mirrors 78.

A beam of unpolarized light falling incident on the first lens array 50 substantially parallel to the central axis 32LC through the small lenses 52, 62 and 82 is divided into a plurality of partial light beams by the first lens array 50. The small lenses 52 converges each of the partial light beams to form an image in the corresponding relay lens 62, and the light beams exit divergent therefrom to fall incident on the second small lenses 82. The shape of the partial light beams incident on each of the second small lenses is substantially the same as the shape at incidence on the first small lenses 52 (although rotated by 180 degrees about axis 32LC). From the second lens array 80, the plurality of partial light beams exit substantially parallel to the axis 32LC.

From the second lens array 80, the partial light beams fall incident on the polarized light selective reflection plate 90h, which separates the light into clockwise and counterclockwise circularly polarized components. One of these components for example the counterclockwise component, is transmitted out through the plate 90h while light of the other or clockwise circularly polarized component is reflected back to fall incident on a polarized light reflecting portion 72h where it is reflected by the reflecting mirror 78 and passes back through the second lens array 80 to the polarized light selective reflection plate 90h.

The reflection by the reflecting mirrors 78 converts the clockwise polarized light to counterclockwise polarized light. In this way, the partial light beams reflected by the polarized light selective reflection plate 90h and the reflecting mirrors 78 are converted to beams of counterclockwise circularly polarized light, permitting them to be transmitted by the 90h.

The partial light beams of counterclockwise polarized light exiting from the polarized light selective reflection plate 90h fall incident on the λ/4 retardation film 92, the polarization axis of which is set at an angle of 45 degrees relative to s polarized light. As a result, the partial light beams incident on the λ/4 retardation film 92 are converted to beams of s polarized light.

The polarized light selective reflection plate 90h can instead be constructed to transmit clockwise polarized light and reflect counterclockwise components. Similarly, the setting of the polarization axis of the λ/4 retardation film 92 can be used to determine whether the partial light beams emerge as p or s linearly polarized light.

Thus, the polarization conversion system 30H also enables unpolarized light to be efficiently converted to one type of linearly polarized light using a simpler configuration than the conventional one.

The λ/4 retardation film 92 can be omitted from the polarization conversion system 30H. That would enable unpolarized light to be converted to substantially one type of circularly polarized light. An arrangement can also be used in which a λ/4 retardation film is provided at the incident or exit side of the first lens array 50. Depending on the optical characteristics of the polarized light selective reflection plate 90h, such a configuration would increase the circularly polarized light splitting efficiency.

The positions and configuration of the elements of the second embodiment can be modified in the same manner as described in the first embodiment.

Figure 8:
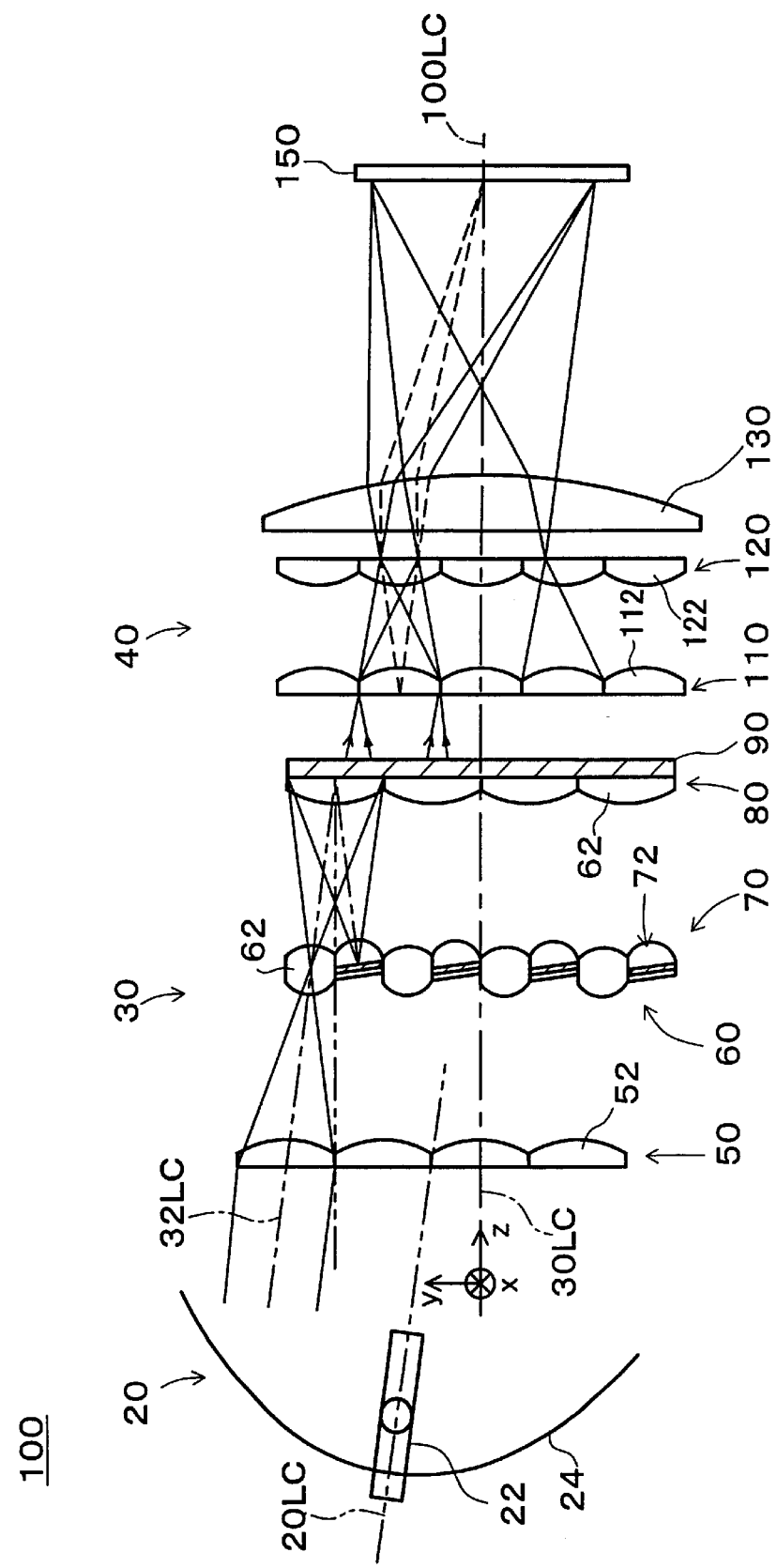
FIG. 8 is a side view of the general configuration of main parts of an illumination system employing the polarization conversion system of the invention.

C. Third embodiment:

FIG. 8 is a side view of the general configuration of main parts of an illumination system employing the polarization conversion system of the invention. The illumination system 100 includes a light source 20, a polarization conversion system 30 (FIG. 1) and a superposition optical system 40.

The polarization conversion system 30 and superposition optical system 40 are arranged so that their respective optical axes coincide with the system optical axis 100LC. Thus, the optical axis 30LC of the polarization conversion system 30 coincides with the system optical axis 100LC of the illumination system 100.

The light source 20 has a light source lamp 22, and a concave mirror 24 that reflects the light from the light source lamp 22 as a substantially parallel beam of light. The light source lamp 22 may be a metal halide lamp, a mercury lamp or other such lamp. It is preferable to use a parabolic mirror as the concave mirror 24. An elliptical or spherical mirror or the like may be used instead of a parabolic mirror.

The light source 20 is arranged so that its optical axis 20LC is parallel to the central axis 32LC through the small lenses 52, 62 and 82 and passes through the center of the first lens array 50. This enables a parallel light flux emitted by the light source 20 to effectively fall incident on the polarization conversion system 30.

The superposition optical system 40 includes a fourth lens array 110, a fifth lens array 120 and a superposition lens 130. Like the first lens array 50 (FIG. 2), the fourth lens array 110 is arranged as a rectangular matrix of O rows and P columns of plano-convex first small lenses 112. In this embodiment, O=5 and P=4. When viewed from the z direction, the external shape of the fourth small lenses 112 corresponds substantially to the shape of the actual illumination area of illumination region 150. For example, assuming that the illumination region is a liquid crystal panel and that the aspect ratio of the image formation area is 4:3, the fourth small lenses 112 will also be given an aspect ratio of 4:3.

The fifth lens array 120 is arranged as a matrix of O rows and P columns of plano-convex fifth small lenses 122 disposed to correspond to the fourth small lenses 112.

A light beam emitted by the polarization conversion system 30 is converted into a plurality of partial light beams by the fourth lens array 110. The fourth small lenses 112 converges each of the partial light beams in the vicinity of the fifth small lens array 120. The fifth small lenses 122 directs the partial light beams to align the central axis of each beam parallel to the system optical axis 100LC. The partial light beams exiting the fifth small lens array 120 are directed by the superposition lens 130 onto substantially the same region on the illumination region 150. Thus, the illumination region 150 is uniformly illuminated with substantially one type of linearly polarized light. To facilitate the explanation, the fifth small lens array 120 and superposition lens 130 are shown as separate elements. However, using the two elements formed as a single unit is an effective way of reducing interfacial light loss. The fifth small lens array 120 can also be made to include the function of the superposition lens 130 by using eccentric lenses as the fifth small lens array 120, in which case the superposition lens 130 can be eliminated.

As explained in the above, the illumination system 100 of the invention employing the inventive polarization conversion system 30 provides illuminating light including substantially one type of linearly polarized light, by means of a simpler configuration than a conventional one.

While the foregoing description relates to the illumination system 100 using the polarization conversion system 30, the polarization conversion system 30H of the second embodiment can also be used, as well as any of the other variations.

Similarly, while the above description was made with reference to the illumination system 100 using the superposition optical system 40 to uniformly illuminate the illumination region, various other types of superposition optical system can also be used, such as glass rod lenses and hollow mirror tubes. The superposition optical system may be omitted.

Figure 9:
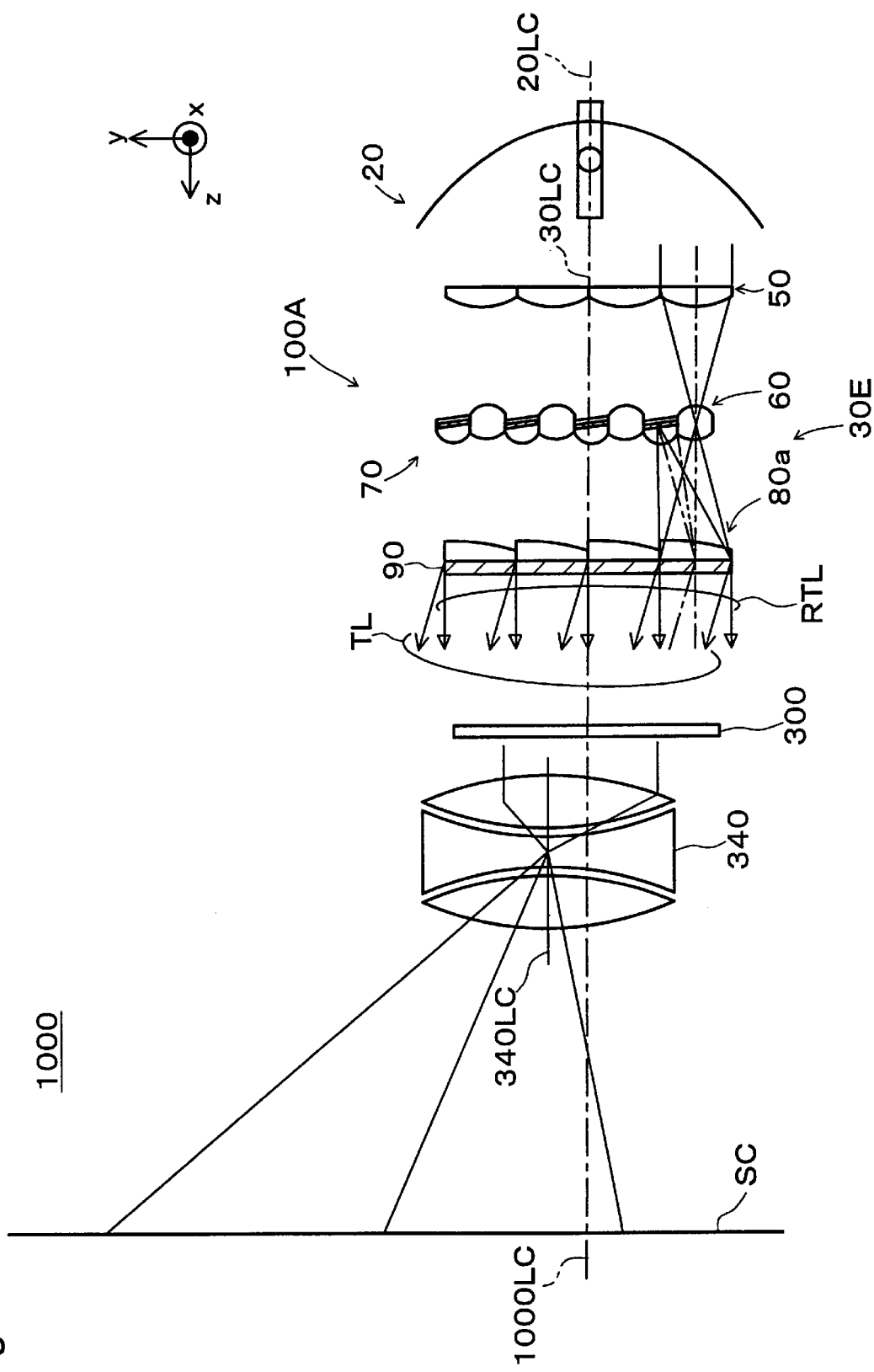
FIG. 9 is a side view of the general configuration of main parts of a projector employing the illumination system of the invention.

D. Fourth embodiment:

FIG. 9 is a side view of the general configuration of main parts of a projector employing the illumination system of the invention. The projector 1000 includes an illumination system 100A, a liquid crystal light valve 300 and a projection optical system 340. To achieve upwardly tilted projection (where the center of the projection plane on the screen is higher than the system optical axis 1000LC of the liquid crystal light valve 300), the projection optical system 340 is positioned so that its optical axis 340LC is set above the system optical axis 1000LC (the +y direction).

The illumination system 100A includes a light source 20 and the polarization conversion system 30E of FIG. 5(B). The light source 20 and polarization conversion system 30E are disposed with their respective optical axes 30LC and 20LC aligned with the system optical axis 1000LC. Compared to the arrangement shown in FIG. 5(B), the polarization conversion system 30E arrangement in the vertical direction is reversed so that the transmitted light TL, which has directly passed through the selective reflection plate 90, proceeds in the tilted direction of projection.

Of the light beams from the light source 20 falling incident on the polarization conversion system 30E substantially parallel to the light source optical axis 20LC, transmitted light TL that has not been reflected by the selective reflection plate 90 is emitted upward in the +y direction. On the other hand, reflected transmitted light RTL that after being reflected by the selective reflection plate 90 and the polarized light reflector array 70 is transmitted by the selective reflection plate 90, exits in a direction that is substantially parallel to the optical axis 30LC of the polarization conversion system.

Light transmitted by the selective reflection plate 90 usually has a higher intensity than the reflected light. Accordingly, effecting incidence of transmitted light rather than reflected light on the projection optical system 340 is more effective in terms of improving the light utilization efficiency.

The projector 1000 is arranged so that the direction of the transmitted light is close to the direction of the tilted projection, serving to increase the light utilization efficiency of the projection optical system 340.

In summary, using the projector 1000 with the illumination system 100A that emits linearly polarized light having substantially one type of polarization improves the light utilization efficiency, particularly the efficiency the case of a liquid crystal light valve such as the liquid crystal light valve 300. The result is the ability to display brighter images. Moreover, the polarized light selective reflection plate 90 is arranged so that the direction of the transmitted light, which has a higher intensity than light reflected by the polarized light selective reflection plate 90, is close to the tilted projection direction, which helps to improve the light utilization efficiency of the projection optical system 340, resulting brighter projected images.

The various illumination systems described in the foregoing can also be used as the illumination system of the projector 1000.

Figure 10:
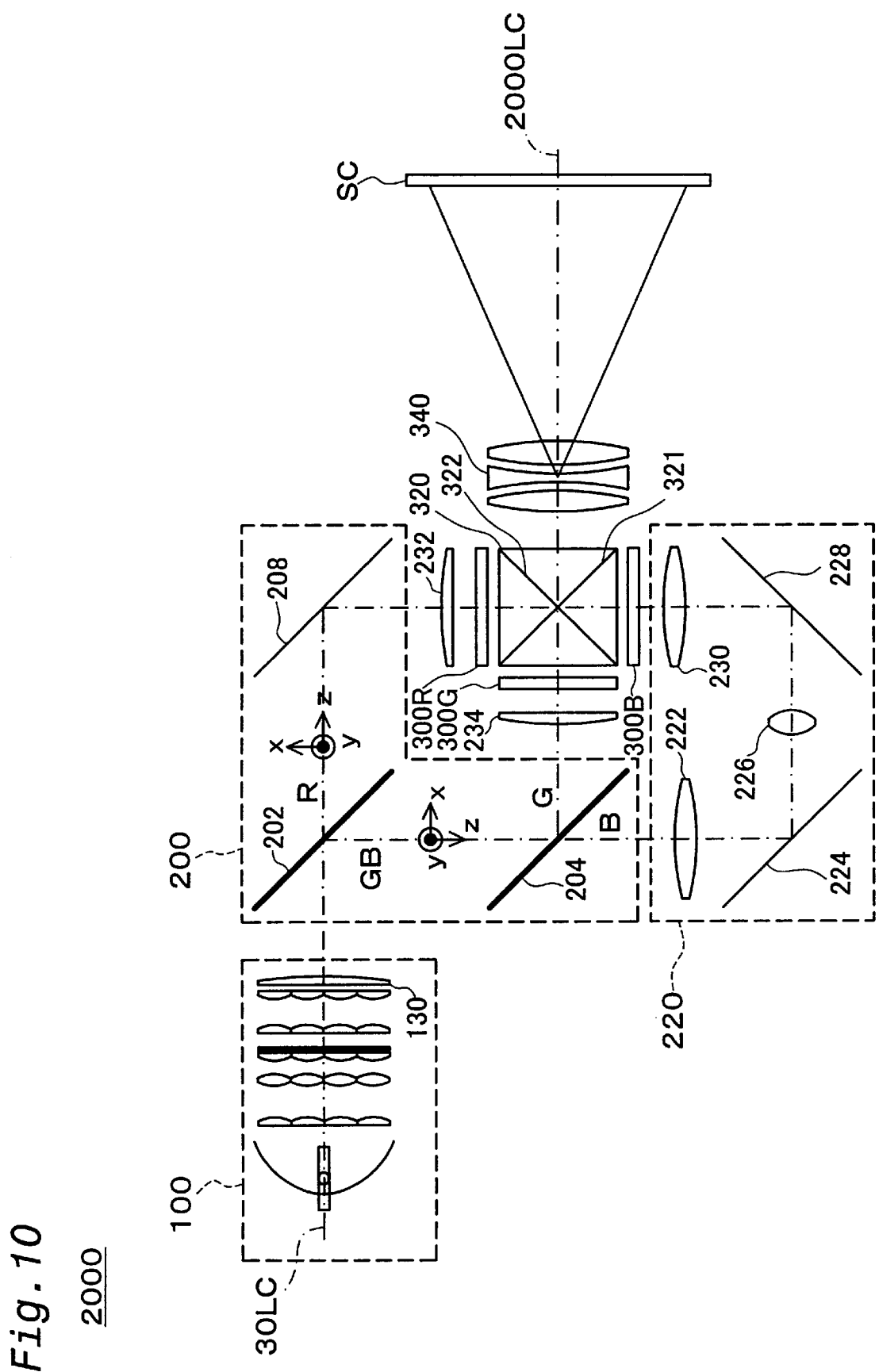
FIG. 10 is a plan view of the general configuration of main parts of a projector that uses the illumination system of the invention.

E. Fifth embodiment:

FIG. 10 is a plan view showing the general configuration of main parts of another projector that uses the illumination system of the invention. This projector 2000 uses the illumination system 100 shown in FIG. 8.

The projector 2000 comprises the illumination system 100, a color separator 200, a light guide system 220, three liquid crystal light valves (liquid crystal panels) 300R, 300G, 300B, a cross dichroic prism 320 and a projection optical system 340. In the projector 2000, light emitted by the illumination system 100 is separated into red (R), blue (B) and green (G) light by the color separator 200. The light of each color passes through the corresponding liquid crystal light valves 300R, 300G and 300B and is modulated in accordance with the image information. The modulated color lights are then combined by the cross dichroic prism 320, and the color image is displayed on a screen SC by the projection optical system 340.

The illumination system 100 emits an illumination beam of linearly polarized light (s polarized light, in this example)

in which the polarized components have the same polarization direction, to illuminate the liquid crystal light valves 300R, 300G, 300B each constituting the illumination region 150. Usually the incident surfaces of the liquid crystal light valves 300R, 300G, 300B are provided with polarizing plates, so the direction of polarization of linearly polarized light from the illumination system 100 is aligned with the transmission axis of the polarizing plates. This enables the light from the illumination system 100 to be efficiently utilized for illumination.

The color separator 200 includes dichroic mirrors 202 and 204 and a reflecting mirror 208 which function to separate the light beam from the illumination system 100 into red, blue and green light. The first dichroic mirror 202 transmits red light components contained in the light from the illumination system 100, and reflects blue and green components. Red light transmitted by the first dichroic mirror 202 is reflected by the reflecting mirror 208 through field lens 232 to the liquid crystal light valve 300R. The field lens 232 converts the partial light beams from the illumination system 100 to light beams parallel to the central axis thereof. Field lenses 234 and 230 provided in front of the other liquid crystal light valves perform the same function.

Of the blue and green light components reflected by the first dichroic mirror 202, green light is deflected by the second dichroic mirror 204 to the green liquid crystal light valve 300G via the field lens 234. The blue light component transmitted by the second dichroic mirror 204 exits the color separator 200 and falls incident on the light guide system 220, in which it passes through entrance lens 222, relay lens 226, reflecting mirrors 224 and 228 and exit lens (field lens) 230, and on to the blue liquid crystal light valve 300B. The reason for using a guide system 220 for the blue light is to prevent a lowering of the light utilization efficiency caused by the fact that the optical path of the blue light is longer than that of the other colors. In other words, it is to enable the blue light to be transmitted to the exit lens 230 unchanged. As a result, the liquid crystal light valves 300R, 300G, 300B each receive illumination light of roughly equal intensity distribution (strictly speaking, the intensity distribution of the blue light is inverted by 180 degrees relative to the intensity distributions of the other colors).

The liquid crystal light valves 300R, 300G and 300B function as light modulating means for modulating the light of each color in accordance with received image information (image signals). The cross dichroic prism 320 functions as a color combiner for combining the light of the three colors thus modulated to form a color image. The cross dichroic prism 320 comprises a red light reflecting surface 321 formed of multi-layer dielectric film stacks and a blue light reflecting surface 322 formed of multi-layer dielectric film stacks, arranged in the form of a cross. The red-reflecting dichroic surface 321 and blue-reflecting dichroic surface 322 effect the color combine for the color images that are to be projected. Light combined by the cross dichroic prism 320 exits to the projection optical system 340, which projects the combined light to display a color image on the screen SC. It is preferable to use telecentric lenses for the projection optical system 340.

Using the projector 2000 with the illumination system 100 that emits linearly polarized light having substantially one type of polarization improves the light utilization efficiency, particularly in the case of liquid crystal light valves.

The various illumination systems described in the foregoing can also be used as the illumination system of the projector 2000.

Figure 11A:
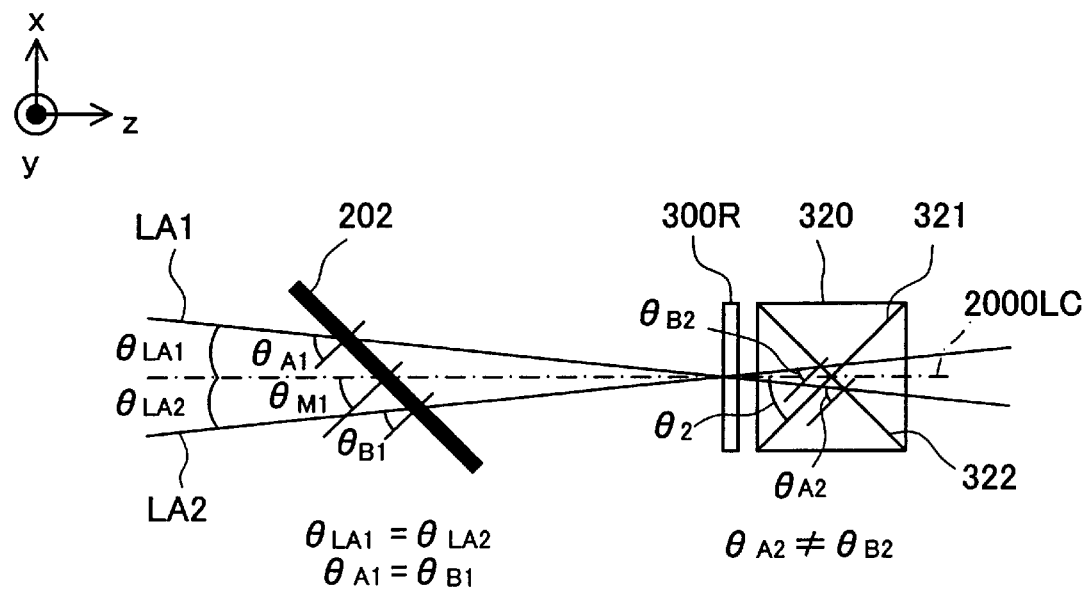
FIGS. 11(A) and 11(B) are explanatory diagrams relating to the light that travels from the illumination system 100 to the first dichroic mirror 202 and cross dichroic prism 320.
Figure 11B:
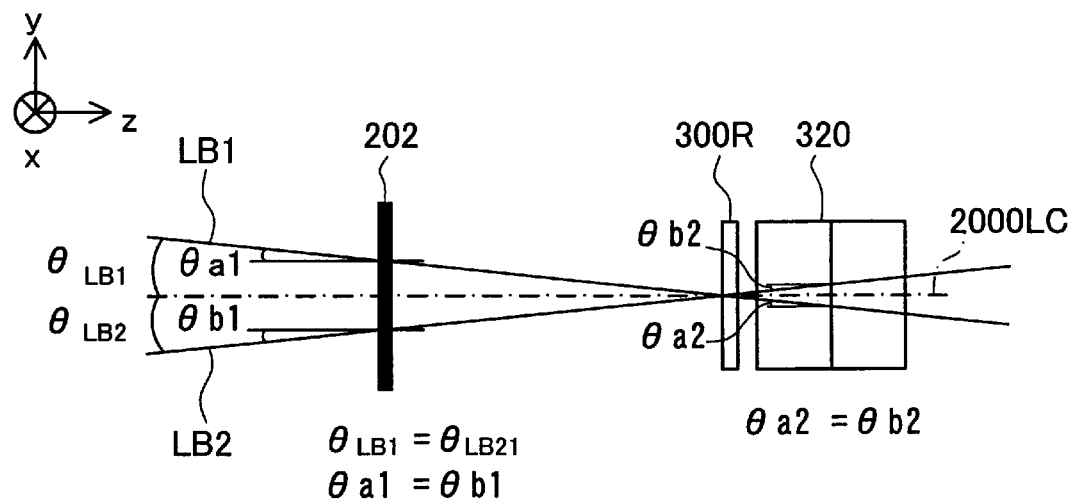

FIGS. 11(A) and 11(B) are explanatory diagrams relating to the light from the illumination system 100 to the first dichroic mirror 202, second dichroic mirror 204 and cross dichroic prism 320. FIGS. 11(A) and 11(B) focus only on the first dichroic mirror 202, the red liquid crystal light valve 300R and the cross dichroic prism 320, for convenience shown arranged in a straight line. As shown in FIG. 11(A) and (B), the first dichroic mirror 202 is positioned substantially perpendicular to the xz plane and forms a prescribed angle θM1 with respect to the yz plane.

Figure 12:
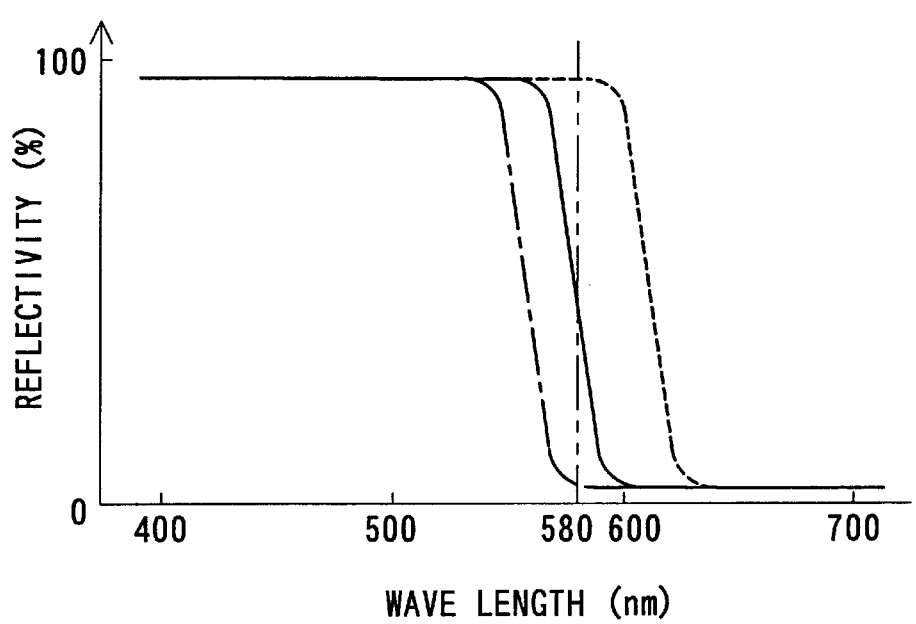
FIG. 12 shows the color separating characteristics of the first dichroic mirror 202.

FIG. 12 shows the color separating characteristics of the first dichroic mirror 202. When a light beam falls incident on the first dichroic mirror 202 at the prescribed angle θM1, the dichroic mirror 202 transmits only the red component (above approximately 600 nm) and reflects the other (blue and green) components as indicated by the solid line in FIG. 12. Deviation in the angle of incidence of light incident on the first dichroic mirror 202 results in a corresponding change in the color separating characteristics. Therefore, unless the light is made to fall incident on the first dichroic mirror 202 at the prescribed angle θM1, there will be a deviation in the red light guided to the red liquid crystal light valve 300R.

As shown in FIG. 11(A), even if two light beams LA1, LA2 are emitted from different points in the x direction at the same absolute angles θLA1, θLA2 relative to the system optical axis 200OLC, the angles of incidence θA1, θB1 of light incident on the first dichroic mirror 202 will still differ and deviate from the prescribed angle θM1. For example, with respect to the light beam LA1 the result will be the type of characteristics indicated by the single-dot broken line in FIG. 12, and with respect to LA2 the type of characteristics represented by the dashed line, instead of the required color separating characteristics denoted by the solid line. Specifically, the angle of incident light on the first dichroic mirror 202, relative to the system optical axis 2000LC, has a major effect on the color separating characteristics of the first dichroic mirror 202 and can readily give rise to color deviation (chromatic change) along the x axis of red light guided to the red liquid crystal light valve 300R.

On the other hand, as shown in FIG. 11(B), if two light beams LB1, LB2 are emitted from different points in the y direction at the same absolute angles θLB1, θLB2 relative to the system optical axis 2000LC, the absolute angles of incidence θa1, θb1 with respect to the first dichroic mirror 202 will also be the same, so that the color separating characteristics with respect to light beams LB1 and LB2 will also be the same. Although the color separating characteristics of the first dichroic mirror 202 are influenced by the angle of light beam incidence on the first dichroic mirror 202, relative to the system optical axis 2000LC, color deviation along the y axis of red light guided to the red-light liquid crystal light valve 300R is less than the deviation along the x axis. Thus, the degree of color deviation in the y direction in the case of red light transmitted via the first dichroic mirror 202 to the red liquid crystal light valve 300R is less than the degree of such color deviation in the x direction.

This shows that with respect to the angle at which a light beam emerges from the illumination system relative to the system optical axis 2000LC, it is preferable for the angle to be smaller in the x direction than in the y direction.

As explained above, light emitted from the illumination system 100 includes light transmitted by the selective reflection plate 90 and reflected transmitted light that is reflected by the selective reflection plate 90 and the polarized light reflector array 70, and then transmitted by the selective reflection plate 90, and this light is combined at the second lens array 80 in the direction in which the relay lenses 62 and polarized light reflecting portions 72 are arrayed. Therefore the angle of divergence (angular spread) of light emerging from the illumination system 100 tends to be larger in the direction in which the colors are combined (the y direction, in FIG. 8) and relatively small at right-angles to the direction in which the color components are combined (the x direction, in FIG. 8).

The above explanation for the first dichroic mirror 202 also applies to the second dichroic mirror 204.

In the projector 2000, the illumination system 100 is arranged so that the direction in which the transmitted light and the reflected transmitted light are combined, that is, the direction in which the relay lenses 62 and polarized light reflecting portions 72 are arrayed, is the y direction. Doing this is advantageous in that it enables color variations in the projected images to be reduced.

The above explanation given with reference to the dichroic mirror also applies to the red-reflecting dichroic surface 321 and blue-reflecting dichroic surface 322 of the cross dichroic prism 320. Specifically, as shown in FIG. 11(A), even if two light beams LA1, LA2 are emitted from different points along the x axis at the same absolute angles θLA1, θLA2 relative to the system optical axis 2000LC, the angles of incidence θA2, θB2 of light incident on the red-reflecting dichroic surface 321 will still mutually differ and deviate from the prescribed angle θM2. On the other hand as shown in FIG. 11(B), if two light beams LB1, LB2 fall incident on the red-reflecting dichroic surface 321 from different points along the y axis at the same absolute angles θLB1, θLB2 relative to the system optical axis 2000LC, the absolute angles of incidence θa2, θb2 with respect to the first dichroic mirror 202 will be the same.

Since, in the projector 2000, the illumination system 100 is arranged so that the direction in which the transmitted light and the reflected transmitted light are combined, which is the direction in which the relay lenses 62 and polarized light reflecting portions 72 are arrayed, is the y direction, color variations will be reduced in the projected images.

As described in the foregoing, when the illumination system of this invention is applied to an apparatus that includes a cross dichroic prism or a color separator with a dichroic mirror, it is preferable that the direction in which the polarized light is split or combined by the dichroic mirror or cross dichroic prism, since this reduces color deviations in the projected image.

The reflecting/transmitting surfaces of the dichroic mirrors 202 and 204 correspond to the color separation surface of the claimed invention, and the dichroic surfaces 321 and 322 of the cross dichroic prism 320 correspond to the color combining surface of the claimed invention.

Figure 13:
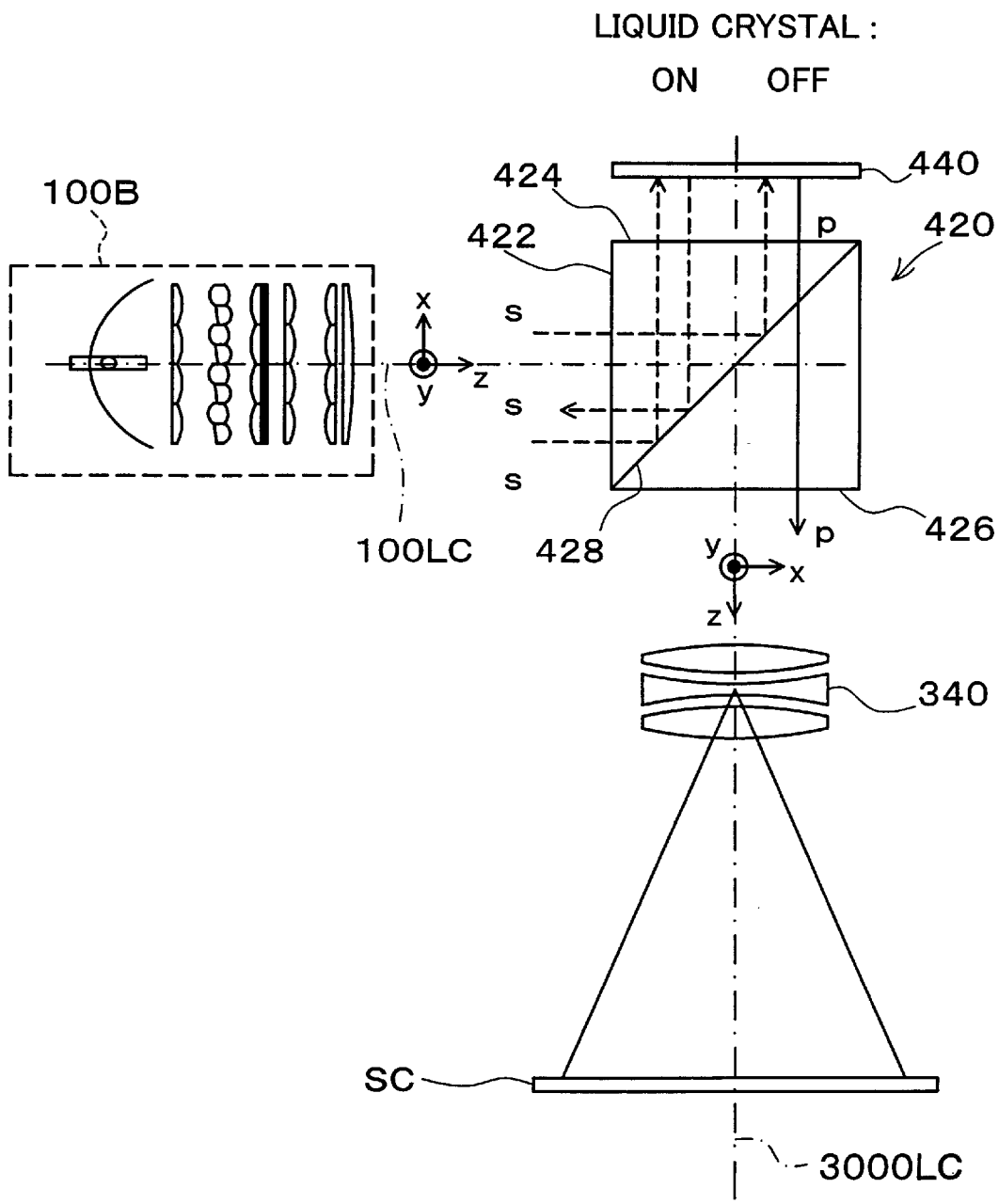
FIG. 13 is a plan view of the general configuration of main parts of another projector that uses the illumination system of the invention.

F. Sixth embodiment:

FIG. 13 is a plan view of the general configuration of main parts of another projector that uses the illumination system of the invention. This projector 3000 uses an illumination system 100B, in which the relay lenses 62 and polarized light reflecting portions 72 of the illumination system 100 are arrayed in the x direction.

The projector 3000 includes the illumination system 100B, a polarization splitting prism 420, a reflection type liquid crystal light valve (liquid crystal panel) 440 and a projection optical system 340. The reflection type liquid crystal light valve 440, polarization splitting prism 420 and projection optical system 340 are disposed in that order on the system optical axis 3000LC.

Linearly polarized light having an s polarization emitted from the illumination system 100B enters the polarization splitting prism 420 via a side surface 422 that is parallel to the system optical axis 3000LC and falls incident on a polarization splitting film 428. S polarized light incident on the polarization splitting film 428 is reflected out through a side surface 424 of the light valve 440.

Light incident on the light valve 440 is reflected out in the opposite direction to the direction of incidence. When the liquid crystal is fully off, the light emerging from the light valve 440 is s polarized light, which enters the polarization splitting prism 420 and is reflected back to the illumination system 100B by the polarization splitting film 428. Therefore, since no light is projected to the projection optical system 340 via the side surface 426 of the polarization splitting prism 420, the result is a dark display screen SC. When the liquid crystal is fully on, the light exiting from the light valve 440 has been converted to p polarized light and so it is transmitted by the polarization splitting film 428, emerges from the side surface 426 of the polarization splitting prism 420 and impinges on the projection optical system 340, producing a light screen display. When the liquid crystal is in an intermediate state between on and off, the intermediate state includes both s and p polarized light, producing a half-tone display.

Thus, the projector 3000 uses light emitted from the illumination system 100 to switch the liquid crystal of each pixel of the light valve 440 on and off in accordance with received image information, to display images on the screen.

Using the projector 3000 with the illumination system 100B that emits linearly polarized light having substantially one type of polarization also improves the light utilization efficiency, particularly with respect to the polarization splitting prism 420, resulting in brighter projected images.

The various illumination systems described in the foregoing can also be applied as the illumination system of the projector 3000.

Figure 14:
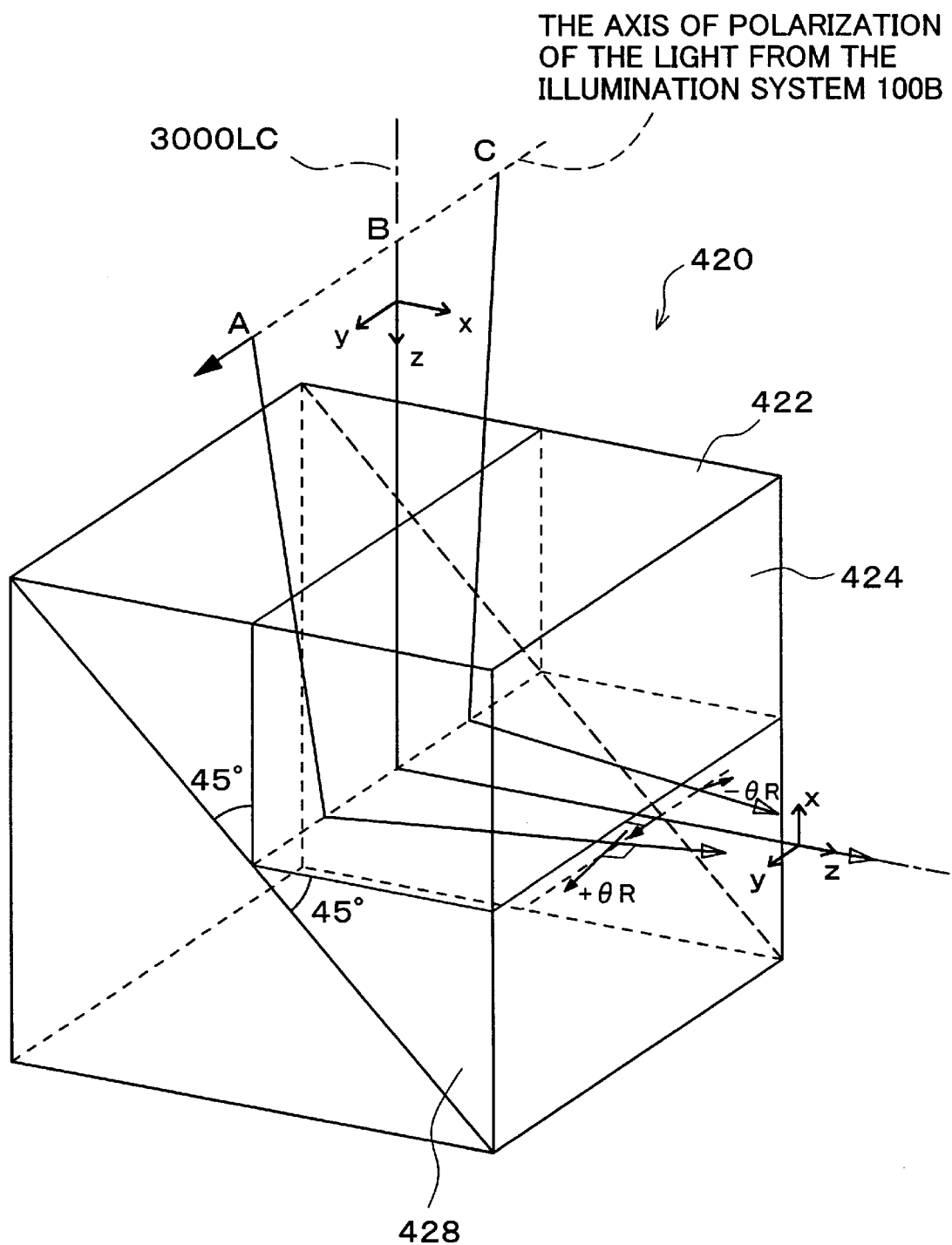
FIG. 14 is an explanatory diagram relating to the light incident on the polarization splitting prism 420.

FIG. 14 is an explanatory diagram relating to the light incident on the polarization splitting prism 420. The axis of polarization of the light from the illumination system 100B incident on the side surface 422 of the polarization splitting prism 420 is taken to be perpendicular (y direction) to the direction in which polarized light is split by the polarization splitting film 428 (the z and x directions). Of the light incident on the side surface 422, the axis of polarization of light B that falls incident along the z axis and is reflected out of the side surface 424 by the polarization splitting film 428 will be oriented in the y direction. However, since light A and C falling incident on the incident surface 422 at an angle to the z axis deviate from the 45-degree angle of incidence to the polarization splitting film 428, when viewed from the z direction, the polarization axes of the light emerging from the side surface 424 are rotated from the y axis by +θR (light A), −θR (light C), taking counterclockwise rotation as positive rotation. If light falls incident on the polarization splitting film 428 at an inclined angle with respect to the z axis within a plane (plane yz) that is perpendicular to the direction in which the polarized light is split by the polarization splitting film 428 (the x and y axis directions), the polarization axis of light reflected by the polarization splitting film 428 will be rotated regardless of the polarized light splitting characteristics of the polarization splitting film 428. This means that even if linearly polarized light falls incident on the polarization splitting prism 420 after the polarization axis has been set beforehand, light exiting from the side surface 424 and falling incident on the liquid crystal light valve 440 will always include undesired linearly polarized light component degrade the brightness and contrast of the projected images. In the plane that includes the direction in which polarization splitting takes place, there is no rotation of the polarization axis with respect to light that is obliquely incident with respect to the z axis.

Therefore it is preferable to use an arrangement whereby the direction in which the angle of divergence (angular spread) of light emerging emitted by the illumination system is smaller be at right-angles to the direction in which polarization splitting is effected by the polarization splitting prism 420.

As described above, light emitted from the illumination system 100B includes light transmitted by the selective reflection plate 90 and reflected transmitted light that has been reflected by the selective reflection plate 90 and by the polarized light reflector array 70, and then transmitted by the selective reflection plate 90, and both types of light are combined at the second lens array 80 in the direction in which the relay lenses 62 and polarized light reflecting portions 72 are arrayed. Therefore the angle of divergence (angular spread) of light emerging from the illumination system 100B tends to be larger in the direction in which the colors are combined (the y direction, in FIG. 8) and relatively small at right-angles to the direction in which the colors are combined (the x direction, in FIG. 8).

Thus, in an illumination system used in a projector that employs a polarization splitting prism, it is preferable that the direction in which the transmitted and the reflected light is combined, meaning the direction in which the relay lenses 62 and polarized light reflecting portions 72 are arrayed, be the same as the direction in which polarization splitting is effected in the polarization splitting prism.

In the projector 3000, the relay lenses 62 and the polarized light reflecting portions 72 are arrayed in the same direction as the polarization splitting direction, making it possible to obtain projected images that are bright and have high contrast.

The polarization splitting prism 420 described in the foregoing corresponds to the polarization splitter of the claimed invention.

Figure 15:
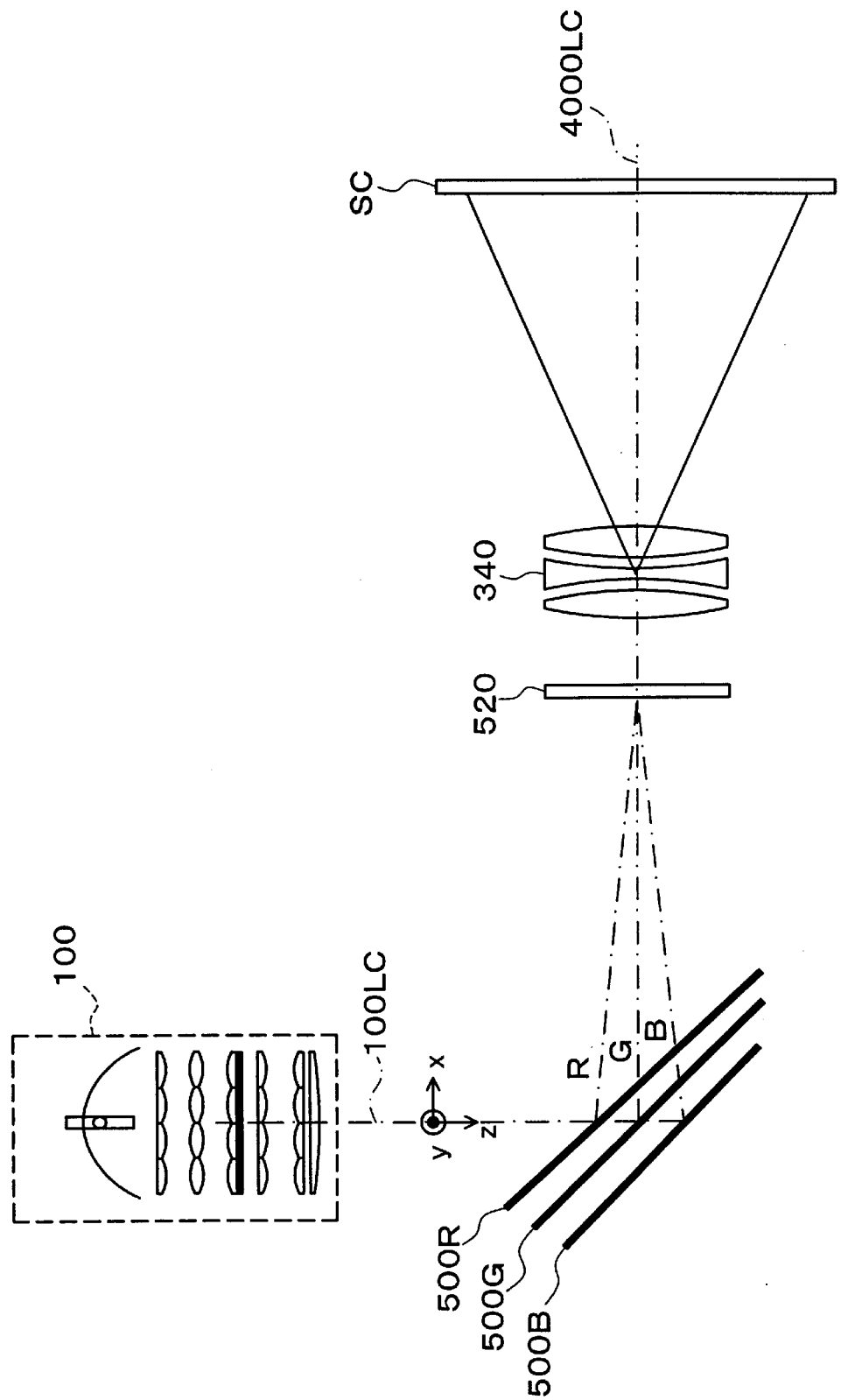
FIG. 15 is a plan view of the general configuration of main parts of another projector that uses the illumination system of the invention.

G. Seventh embodiment:

FIG. 15 is a plan view of the general configuration of main parts of another projector that uses the illumination system of the invention. This projector 4000 uses illumination system 100.

The projector 4000 includes an illumination system 100, three dichroic mirrors 500R, 500G and 500B, a transmission type color liquid crystal light valve (liquid crystal panel) 520 and a projection optical system 340. The dichroic mirrors 500R, 500G and 500B reflect red (R), green (G) and blue (B) light, respectively, and transmit other colors. The mirrors 500R, 500G, 500B are arranged in that order on the side near the illumination system 100, in a mutually non-parallel relationship. The dichroic mirrors do not have to be arranged in this order, but their arrangement is determined on the basis of the pixel configuration of a single-panel type color liquid crystal light valve 520, described later. Also, a reflecting mirror can be used instead of the dichroic mirror that is farthest from the illumination system 100 (dichroic mirror 500B, in this embodiment).

The dichroic mirrors 500R, 500G and 500B are located close to the intersection between the system optical axis 100LC of the illumination system 100 and the projection system optical axis 4000LC that runs through the center of the single-panel type color liquid crystal light valve 520, with the normal line of the mirror surface of the green-reflecting dichroic mirror 500G and the optical axis 100LC of the illumination system 100 forming an angle of 45 degrees. The red-reflecting dichroic mirror 500R is rotated clockwise about the y axis, setting it at a slight angle to the dichroic mirror 500G. The blue-reflecting dichroic mirror 500B is also rotated slightly about the y axis to set it an a slight angle to the dichroic mirror 500G. The positional relationships are explained below.

Of the light emitted from the illumination system 100, red light is reflected by the dichroic mirror 500R onto the light valve 520. After being transmitted by the dichroic mirror 500R, green light is reflected by the dichroic mirror 500G, going through the dichroic mirror 500R and onto the light valve 520. Blue light passes through the dichroic mirrors 500R and 500G, and is then also reflected by the dichroic mirror 500B to reach the light valve 520. As the three dichroic mirrors are set at different angles around an axis of rotation disposed in the y direction, the light reflected by each dichroic mirror falls incident on the light valve 520 at a different angle.

FIGS. 16(A) and 16(B) are enlarged depictions of one pixel configuration of the single-panel type color liquid crystal light valve 520. As shown in FIG. 16(A), the light valve 520 includes a light valve portion 530 comprised by a plurality of pixels, and a micro-lens array 540 provided on the incident surface of the light valve portion 530. Each pixel 531 of the light valve portion 530 includes three color sub-pixels 531R, 531G, 531B corresponding to red (R), green (G) and blue (B). The incident surface of each pixel 531 is provided with one micro-lens 541. The light beams of three colors impinging on the single-panel type color liquid crystal light valve 520 at different angles of incidence are each converged by the individual micro-lenses 541 of the micro-lens array 540 onto the corresponding sub-pixels 531R, 531G, 531B and each sub-pixel modulates the color light in accordance with image information signals applied to the system.

The angles of incidence of the light of each color on the light valve 520, corresponding to the angles of the three dichroic mirrors 500R, 500G and 500B, are set so that the light of each color impinges on the corresponding pixel 531. These angles are determined by the spacing PD between the sub-pixels 531R, 531G, 531B and the focal distance fit of the micro-lenses 541.

Light exiting each of the pixels 531 of the light valve 520 is projected by the projection optical system 340 to display a color image onto the screen SC.

Using the illumination system 100, with its high polarized light conversion efficiency, also increases the light utilization efficiency of the projector 4000 of this embodiment, enabling it to display brighter images.

As described, light emitted from the illumination system 100 includes light transmitted by the selective reflection plate 90 and reflected transmitted light that has been reflected by the selective reflection plate 90 and by the polarized light reflector array 70, and then transmitted by the selective reflection plate 90, and both types of light are combined at the second lens array 80 in the direction in which the relay lenses 62 and polarized light reflecting portions 72 are arrayed. Therefore the angle of divergence (angular spread) of light emerging from the illumination system 100 tends to be larger in the direction in which the colors are combined (the y direction, in FIG. 8) and relatively small at right-angles to the direction in which the colors are combined (the x direction, in FIG. 8). There is an inverse relationship between the beam divergence angle and beam condensing properties. A small convergence image cannot be formed with a light beam having a large angle of divergence, which means that the larger the angle of divergence of the light used to illuminate a liquid crystal light valve, the lower the light utilization efficiency of the light valve or projection optical system.

As shown in FIG. 16(B), the sub-pixels 531R, 531G, 531B constituting one pixel 531 of the light valve 520 each has a rectangular shape that is extended in the y direction, resulting in a roughly square pixel 531, when viewed from the z direction. Therefore, by using an arrangement which matches the shape of the sub-pixels with optical characteristics such as the angle of divergence or the convergence of the light beam incident thereon, it becomes possible to prevent such a decrease in the light utilization efficiency even when, as in the case of the illumination system 100, the beam emitted by the illumination system has a relatively large angle of divergence in a specific direction. Specifically, the direction in which the beam from the illumination system 100 exhibits a large angle of divergence is preferably set to coincide with the longer sides of the rectangular sub-pixels. With such an arrangement, the converged image is small in the x direction and relatively large in the y direction, enabling light of each color to impinge on the corresponding sub-pixel.

So, in the case of a projector using light valves in which the color sub-pixels are spatially separated, such as single-panel type color liquid crystal light valves, it is preferable for the direction in which the transmitted light and the reflected transmitted light are combined, meaning the direction in which the relay lenses 62 and polarized light reflecting portions 72 are arrayed, to be aligned with the direction in which the long dimension of the sub-pixels is oriented. In the illumination system 100 used by the projector 4000, the relay lenses 62 and polarized light reflecting portions 72 are arrayed in the y direction and the direction in which the light beam emitted by the illumination system 100 exhibits the largest divergence is thus aligned with the long dimension of the sub-pixels, so the light of each color impinges only on the corresponding sub-pixel, resulting in images that are bright and free of mixed colors.

The above description was made with reference to the illumination system of the invention applied to a projector, this is not limitative. Instead, the illumination system of the invention can be applied to various types of apparatus, including direct-viewing display systems.

Although a liquid crystal panel is used as an electro-optical device, any type of electro-optical devices may be used that utilizes a specifically polarized light to display images.

Similarly, although the above embodiments were described with reference to the use of multiple arrays of lenses to configure the relay lens optical system comprising the polarization conversion system, the invention is not limited to this. For example, instead of using arrays of first lenses, relay lenses and second lenses, the polarization conversion system may include one first small lens 52, one relay lens 62, one polarized light reflecting portion 72, one second small lens 82 and the polarized light selective reflection plate 90. Such a configuration would still provide the similar effect. At the same time, since an array configuration makes it possible to construct a thinner polarization conversion system, in terms of reducing the size of the optical system, it is advantageous to use a configuration that includes a first lens array, relay lens array and second lens array.

It should be clearly understood that the above embodiments are only illustrative and not restrictive in any sense. The scope and spirit of the present invention are limited only by the terms of the appended claims.

What is claimed is:

1. A polarization conversion system that converts unpolarized light to light of a specific polarization, comprising:

a polarized light selective reflector that separates incident unpolarized light into first and second types of polarized light, transmits the first type of polarized light and reflects the second type of polarized light, a relay optical system that relays a given incident light beam onto the polarized light selective reflector, and a polarized light reflector, disposed at a selected position on an optical path of a reflected light beam reflected by the polarized light selective reflector, that reflects the reflected light beam back to the polarized light selective reflector while converting the second type of polarized light to polarized light of the first type.

2. The polarization conversion system according to claim 1, wherein the relay optical system includes:

a first lens array having a plurality of first small lenses that divides an incident light beam into a plurality of partial light beams, a relay lens array, disposed on a light emission side of the first lens array, having a plurality of relay lenses corresponding to the plurality of first small lenses, and a second lens array, disposed on a light emission side of the relay lens array having a plurality of second small lenses corresponding to the plurality of relay lenses, wherein the second lens array is positioned in proximity to the entry side of the polarized light selective reflector so that each of the reflected partial light beams that exit the second small lenses and are reflected by the polarized light selective reflector is reflected back to the same second small lens from which the partial light beam exited prior to being reflected by the polarized light selective reflector, wherein each of the plurality of relay lenses is located at a selected position that is in proximity to an exit side focal point of the corresponding first small lens and to an entry side focal point of the corresponding second small lens, and the corresponding first small lens and the corresponding second small lens are located at conjugate points of the relay lens, wherein the polarized light reflector includes: a plurality of polarized light reflection portions, disposed on optical paths of a plurality of reflected partial light beams exiting from the plurality of second small lenses, the polarized light reflection portion each reflecting a corresponding reflected partial light beam and converting the second type of polarized light to polarized light of the first type, and a plurality of third small lenses that direct reflected partial light beams reflected by the polarized light reflection portions to go back to the same second small lenses from which the reflected partial light beams exited prior to being reflected by the polarized light reflection portions.

3. The polarization conversion system according to claim 2, wherein the plurality of polarized light reflection portions are each positioned in proximity to a focal point of a corresponding second small lens, and the plurality of third small lenses each has a focal distance substantially equal to that of corresponding the second small lenses and are disposed in proximity to a corresponding polarized light reflection portion.

4. The polarization conversion system according to claim 3, wherein the first and second types of polarized light are first and second types of linearly polarized light having mutually orthogonal polarization planes, and each of the plurality of polarized light reflection portions includes a reflecting mirror and a $\lambda/4$ retardation film positioned between the third small lenses and the reflecting mirror.

5. The polarization conversion system according to claim 3, wherein the first and second types of polarized light are first and second types of circularly polarized light circularly polarized in reverse rotations and the plurality of polarized light reflection portions are reflecting mirrors.

6. The polarization conversion system according to claim 5, further comprising a λ/4 retardation film that converts the first type of circularly polarized light transmitted by the polarized light selective reflector to a predetermined type of linearly polarized light.

7. A projector for displaying projected images, comprising:

an illumination system according to claim 5, an electro-optical device that modulates light emitted from the illumination system, and a projection optical system that projects light thus modulated by the electro-optical device onto a projection surface.

8. The projector according to claim 7, wherein a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with a direction of tilted projection by the projection optical system.

9. The projector according to claim 8, wherein the transmitted light beam is inclined in a direction that substantially coincides with the direction of tilted projection by the projection optical system.

10. A projector for displaying projected images, comprising:

an illumination system according to claim 5, a color separator that separates light emitted from the illumination system into a plurality of color components, a plurality of electro-optical devices each modulate light of each color components separated by the color separator, a color combiner for combining light of each color component thus modulated by the electro-optical device, and a projection optical system that projects light thus combined by the color combiner onto a projection surface.

11. The projector according to claim 10, wherein, assuming x, y, z as three mutually orthogonal directional axes where z is a direction parallel to an optical axis, of light emerging from the illumination system, the color separator has a color separation surface that is substantially perpendicular to plane xz and forms a prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction y.

12. The projector according to claim 10, wherein, assuming x, y, z as three mutually orthogonal directional axes where z is a direction parallel to an optical axis of light emerging from the illumination system, the color combiner has a color combining surface that is substantially perpendicular to plane xz and forms a prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction y.

13. A projector for displaying projected images, comprising:

an illumination system according to claim 5, a reflecting type electro-optical device that modulates incident light in accordance with received image information while reflecting the modulated light, a projection optical system that projects light received from the reflecting type electro-optical device onto a projection surface, and a polarization splitter that spatially separates into different directions first polarized light entering the reflecting type electro-optical device from the illumination system and second polarized light entering the projection optical system from the reflecting type electro-optical device, in accordance with differences in polarization characteristics therebetween.

14. The projector according to claim 13, wherein, assuming x, y, z as three mutually orthogonal directional axes where z is a direction parallel to an optical axis of light emerging from the illumination system, the polarization splitter has a polarized light separation surface that is substantially perpendicular to plane xz and forms a prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction x.

15. A projector for displaying projected images, comprising:

an illumination system according to claim 5, an electro-optical device that includes a plurality of pixels each including a plurality of sub-pixels corresponding to light of each of a plurality of color components and a condenser optical system including a plurality of small condenser elements corresponding to each pixel, the electro-optical device modulating light at each pixel responsive to given image information, a color separator that separates light emerging from the illumination system into a plurality of color components and also directs the plurality of color components in mutually different directions to impinge on the plurality of sub-pixels corresponding thereto, and a projection optical system that projects light of each color component thus modulated by the electro-optical device onto a projection surface.

16. The projector according to claim 15, wherein, assuming x, y, z as three mutually orthogonal directional axes where z is a direction parallel to an optical axis of light emerging from the illumination system, the color separator has a plurality of color separation surfaces for selectively separating light into a plurality of colors that is substantially perpendicular to plane xz and forms a different prescribed angle with respect to plane yz, and a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that substantially coincides with direction y.

17. The projector according to claim 15, wherein a transmitted light beam transmitted by the polarized light selective reflector and a reflected light beam that is reflected by the polarized light selective reflector and that is also reflected by the polarized light reflector to again fall incident on the polarized light selective reflector are combined in the polarized light selective reflector in a direction that is perpendicular to a direction in which is arrayed the plurality of sub-pixels included in each pixel.

18. The polarization conversion system according to claim 2, wherein the first and second types of polarized light are first and second types of linearly polarized light having mutually orthogonal polarization planes, and each of the plurality of polarized light reflection portions includes a reflecting mirror and a $\lambda/4$ retardation film positioned between the third small lenses and the reflecting mirror.

19. The polarization conversion system according to claim 2, wherein the first and second types of polarized light are first and second types of circularly polarized light circularly polarized in reverse rotations and the plurality of polarized light reflection portions are reflecting mirrors.

20. The polarization conversion system according to claim 19, further comprising a $\lambda/4$ retardation film that converts the first type of circularly polarized light transmitted by the polarized light selective reflector to a predetermined type of linearly polarized light.

21. An illumination system for illuminating a prescribed illumination region, comprising:

a polarization conversion system according to any one of claims 1 to 6, and a light source that emits a light beam toward the polarization conversion system.

22. The illumination system according to claim 21, further comprising a superposition lens that divides a light beam from the polarization conversion system into a plurality of partial light beams and superposes the plurality of partial light beams onto the illumination region.

* * * * *